(12) United States Patent
Short et al.

(10) Patent No.: US 9,842,504 B2
(45) Date of Patent: *Dec. 12, 2017

(54) SYSTEMS AND METHODS FOR VESSEL POSITION REPORTING AND MONITORING

(71) Applicant: exactEarth Ltd., Cambridge (CA)

(72) Inventors: Christopher M. Short, Cambridge (CA); Arunas G. Macikunas, Cambridge (CA); Baljinder S. Randhawa, Kitchener (CA); Margaret J. Browning, Bradenton, FL (US); Balaji Kumar, Cambridge (CA)

(73) Assignee: exactEarth Ltd., Cambridge (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/590,574

(22) Filed: May 9, 2017

(65) Prior Publication Data

US 2017/0256169 A1    Sep. 7, 2017

Related U.S. Application Data

(63) Continuation of application No. 14/755,203, filed on Jun. 30, 2015.

(51) Int. Cl.
*G08G 3/00* (2006.01)
*B63J 99/00* (2009.01)

(52) U.S. Cl.
CPC .......... *G08G 3/00* (2013.01); *B63J 2099/008* (2013.01)

(58) Field of Classification Search
CPC ......... G06Q 10/0833; G06Q 10/08355; G06Q 10/0838; G01S 13/91; G01S 13/9307
See application file for complete search history.

(56) References Cited

U.S. PATENT DOCUMENTS

| | | | |
|---|---|---|---|
| 6,658,349 B2 | 12/2003 | Cline | |
| 7,889,100 B2 | 2/2011 | Miller | |
| 2004/0193367 A1 | 9/2004 | Cline | |
| 2006/0142913 A1 | 6/2006 | Coffee | |
| 2006/0187026 A1* | 8/2006 | Kochis | G06Q 10/08 340/539.13 |
| 2008/0117029 A1 | 5/2008 | Dohrmann | |
| 2013/0069824 A1* | 3/2013 | Madhani | G01S 19/30 342/357.69 |
| 2015/0166163 A1* | 6/2015 | Longson | B63J 99/00 340/984 |
| 2016/0258757 A1 | 9/2016 | Heckman | |
| 2016/0286355 A1 | 9/2016 | Shur | |

OTHER PUBLICATIONS

International Search Report and Written Opinion dated Apr. 4, 2016 in corresponding International Patent Application No. PCT/CA2015/050933.

* cited by examiner

*Primary Examiner* — Kabir A Timory
(74) *Attorney, Agent, or Firm* — Bereskin & Parr LLP/S.E.N.C.R.L., s.r.l.; Isis E. Caulder; Paul R. Horbal

(57) ABSTRACT

Systems and methods for vessel position reporting and monitoring. Methods and systems for augmenting e-Navigation messages to provide ancillary information, such as a history of previous vessel positions. A compact representation is provided, in which transmitters may select among a plurality of possible position layouts to provide a compact representation. Transmitted messages are received by a satellite or other surveillance platform employing a compatible radio frequency receiver to collect message signals over a large area or great distance.

27 Claims, 10 Drawing Sheets

SYSTEMS AND METHODS FOR VESSEL POSITION REPORTING AND MONITORING

CROSS-REFERENCE TO RELATED APPLICATION

This application is a continuation of U.S. patent application Ser. No. 14/755,203, filed Jun. 30, 2015, the entire content of which is hereby incorporated by reference.

FIELD

The described embodiments relate to tracking of vessels and other objects and, more particularly, to methods and systems for providing enhanced position reports in tracking messages.

BACKGROUND

Vessels and other objects that can change position over time may be tracked using various systems and approaches. For example, E-Navigation is a concept developed by the International Maritime Organization (IMO) to improve safety and security of commercial shipping operations by facilitating better communication and organization of data between ships and shore-based facilities.

E-Navigation has been defined as the "harmonized collection, integration, exchange, presentation and analysis of marine information onboard and ashore by electronic means to enhance berth to berth navigation and related services for safety and security at sea and protection of the marine environment."

As such, e-Navigation incorporates and expands on a number of technologies, including the Automatic Identification System (AIS), Electronic Chart Display and Information System (ECDIS), Integrated Bridge Systems/Integrated Navigation Systems (IBS/INS), Automatic Radar Plotting Aids (ARPA), Long Range Identification and Tracking (LRIT) systems, Vessel Traffic Services (VTS) and the Global Maritime Distress Safety System (GMDSS).

SUMMARY

In a first broad aspect, there is provided a method of transmitting a message that identifies a geographical position, the method comprising: encoding a track history to generate an encoded track history; generating the message comprising the encoded track history; and transmitting the message.

In some cases, the method may further comprise updating the track history based on the geographical position or course over ground, or both.

In some cases, the method may further comprise setting a message type identifier, wherein the message further comprises the message type identifier.

In some cases, the method may further comprise retrieving a transmitter identifier, wherein the message further comprises the transmitter identifier.

In some cases, the track history comprises one or more track history points based on prior geographical positions. In some cases, each of the one or more track history points are separated by a preselected time interval.

In some cases, each of the track history points is determined with reference to a predetermined point layout that has a plurality of predefined point positions. In some cases, each of the track history points is selected by approximating the position associated with a previous message to one of the predefined point layout positions.

In some cases, the method may further comprise selecting the predetermined point layout from a plurality of possible point layouts. In some cases, the predetermined point layout is selected by computing minimum mean square error of the one or more track history points relative to the predefined point positions in each of the plurality of possible point layouts. In some cases, the predetermined point layout is selected by computing maximum error of the one or more track history points relative to the predefined point positions in each of the plurality of possible point layouts.

In some cases, the method may further comprise selecting a first dimensional component value array, wherein the first dimensional component value array defines the values of successive points in the predetermined point layout.

In some cases, the first dimensional component value arrays are defined in a first look up table having a first index. In some cases, each track history point in the track history is identified at least by a respective index value from the first index. In some cases, each of the respective index values is Huffman encoded in the track history.

In some cases, the method may further comprise selecting a second dimensional component value array, wherein the second dimensional component value array defines the values of successive points in the predetermined point layout.

In some cases, the second dimensional component value arrays are defined in a second look up table having a second index. In some cases, the first and second indices are selected in a point layout look-up table.

In some cases, at least one of the track history points comprises an alert flag tag.

In some cases, the encoding comprises determining the track history is a partial track history that includes less than a preset number of track history points.

In some cases, the message comprises a binary payload and the encoded track history is comprised in the binary payload.

In some cases, the binary payload comprises at least one of an alert identifier, a course over ground indication, a latitude and longitude indication and a cyclic redundancy check code.

In some cases, the method may further comprise error protection encoding the binary payload.

In another broad aspect, there is provided an apparatus for transmitting a message that identifies a geographical position, the apparatus comprising: a memory that stores a track history; a processor configured to: encode the track history to generate an encoded track history; generate the message comprising the encoded track history; and a transmitter that transmits the message.

In another broad aspect, there is provided a system for transmitting and receiving track histories, the system comprising: a transmitting device, the transmitting device comprising: a memory that stores a track history; a processor configured to: encode the track history to generate an encoded track history; generate the message comprising the encoded track history; and a transmitter that transmits the message in a signal; and a receiving device, the receiving device comprising: a receiver, the receiver configured to receive the signal and identify the message; a processor configured to decode the encoded track history and obtain the track history.

In another broad aspect, there is provided a non-transitory computer readable medium storing computer executable instructions, the instructions, when executed by a computer processor, for causing the computer processor to perform a method of transmitting a message that identifies a geographical position, the method comprising: encoding a track history to generate an encoded track history; generating the message comprising the encoded track history; and controlling a transmitter to transmit the message.

In another broad aspect, there is provided a method of processing a message, the method comprising: receiving a first message, the first message comprising a track history that has error-protection encoding applied thereto; storing the first message when the error-protection encoding cannot be successfully decoded; receiving a second message, the second message containing the track history with error-protecting encoding applied thereto; storing the second message when the error-protection encoding cannot be successfully decoded; determining that the first message and the second message belong to a common burst sequence; processing the first message and the second message to generate a recovered message; and decoding the error-protection encoding of the recovered message to obtain the track history.

In another broad aspect, there is provided a system for processing a message, the system comprising: a memory; a processor configured to: receive a first message, the first message comprising a track history that has error-protection encoding applied thereto; store the first message when the error-protection encoding cannot be successfully decoded; receive a second message, the second message containing the track history with error-protecting encoding applied thereto; store the second message when the error-protection encoding cannot be successfully decoded; determine that the first message and the second message belong to a common burst sequence; process the first message and the second message to generate a recovered message; and decode the error-protection encoding of the recovered message to obtain the track history.

In another broad aspect, there is provided a method of processing a message, the method comprising: receiving a first message, the first message comprising a track history, wherein each of the track history points is determined with reference to a predetermined point layout defined in the first message, the predetermined point layout having a plurality of predefined point positions; and processing the first message to obtain the track history.

BRIEF DESCRIPTION OF THE DRAWINGS

For a better understanding of the various embodiments described herein, and to show more clearly how they may be carried into effect, reference will now be made, by way of example only, to the accompanying drawings in which.

DESCRIPTION OF EXEMPLARY EMBODIMENTS

Figure 1:
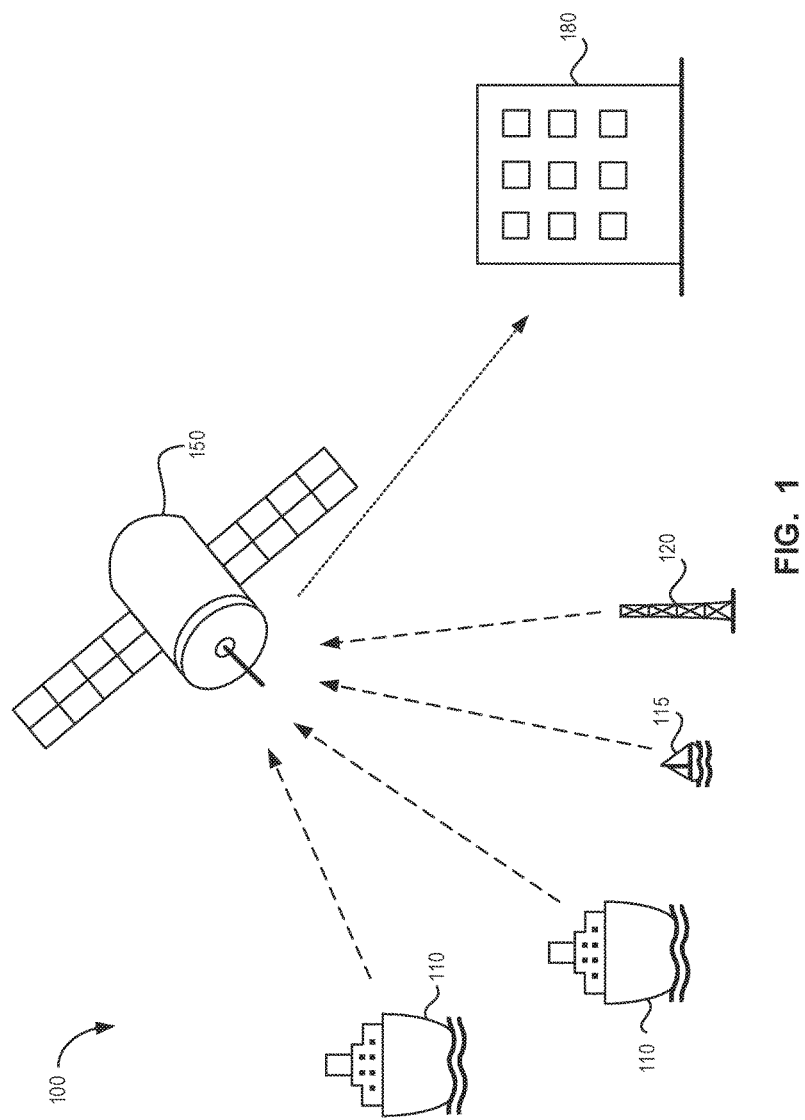
FIG. 1 is a simplified schematic diagram of an example for satellite aspects of e-Navigation system.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail since these are known to those skilled in the art. Furthermore, it should be noted that this description is not intended to limit the scope of the embodiments described herein, but rather as merely describing one or more exemplary implementations.

Messaging between ships and other stations is a core requirement of e-Navigation. In part due to the mandated use of AIS in commercial shipping, the developers of e-Navigation have selected AIS as the messaging platform for e-Navigation.

AIS is a Radio Frequency (RF)-based communications and collision avoidance system for large SOLAS (Safety of Life at Sea) class vessels.

Since 2004, the IMO has required AIS transponders to be aboard all vessels that exceed 300 gross tons or passenger vessels of any size. Class A AIS transceivers are designed for these large ships. Additionally, AIS technology is increasingly being deployed in smaller vessels and is also being installed in Aids-To-Navigation (AtoN) and Search and Rescue (SAR) vessels and aircraft. Since the deployment of AIS, the IMO has begun the process of defining e-Navigation. E-Navigation uses the AIS communication system to facilitate various e-Navigation requirements, and specifically will require the heavy usage of Application Specific Messages (ASMs).

A Class A transceiver transmits with a power of up to 12.5 W, which is sufficient for short-range (typically 20-30 nautical miles) ship-to-ship and ship-to-shore communications. The system uses narrowband (i.e. 25 kHz Bandwidth) Very High Frequency (VHF) channels, at 161.975 MHz and 162.025 MHz for example, and a communication method called Self-Organizing Time Division Multiple Access (SOTDMA). The ITU has also reserved additional channels for the use of AIS to support e-Navigation, and other organizing/access schemes may also be used in some cases.

Each AIS transceiver also includes a receiver component, enabling a ship to receive AIS signals emitted by ships around it. Each minute, each VHF channel is divided into 2,250 time slots, each of which can accommodate one 26.67 ms AIS transmission (i.e. AIS signal). The time slots are accurately synchronized to Coordinated Universal Time (UTC), typically using a Global Navigation Satellite System (GNSS), such as the Global Positioning System (GPS). Each AIS unit reserves time slots for future AIS transmissions from the ship. Other AIS units within range can therefore maintain a map of reserved slots and avoid transmitting during these intervals. This self-organizing feature avoids signal collisions over the short ranges involved in surface transmissions.

Class A transceivers are high powered and some vessels may lack on-board power sufficient to operate the transceiver for long journeys. Class A transceivers may also be prohibitively expensive for smaller vessels. Accordingly, the AIS standard also defines a second class of transceiver, called Class B, which is intended for smaller vessels. A Class B transceiver typically includes one VHF transmitter, two VHF Carrier Sense Time Division Multiple Access (CSTDMA) receivers, which can alternate as VHF Digital Selective Calling (DSC) receivers, and a GNSS receiver. Some Class B transceivers may use the SOTDMA access scheme or above simpler carrier-sense (CS) access scheme to share the channel with Class A transceivers. The Class B transceiver transmits a standard AIS data stream, as with Class A transceivers. However, in contrast to Class A transceivers, a Class B transceiver is limited to 2 W of transmission power, combined with a lower antenna mast height typical of smaller vessels, the conventional range of a Class B transceiver is lower than most Class A transceivers.

CSTDMA transceivers listen for other transmissions and attempt to identify slots that are not in use by another AIS transmitter. Typically, Class B transmitters have a default transmit rate of one message per 30 seconds, although this can be varied.

Ships employing AIS broadcast key details every few seconds about their identification, current position, heading and speed, allowing the ships to select a safe course even when conditions prevent visual contact. The AIS system supports a number of different types of signal.

Conventionally, the principal AIS signal sent by a ship is a position report that provides information pertaining to the ship's identification, location, course, speed, and other details. More recently, ASMs allow for the definition of additional AIS message subtypes. Through the use of ASMs, AIS can be extended or leveraged to transmit a variety of other types of data, as described further herein. This extensibility is leveraged by e-Navigation to transmit other types of data. For example, IMO defines ASM subtypes for transmitting weather observation reports from ships, maritime traffic signals and berthing data, among others. ASMs can also be used to communicate free-form binary payloads.

The IMO, and others, have recognized that the use of ASMs within AIS and e-Navigation will continue to increase causing an ever more congested environment on the VDL (VHF Data Link) used for AIS and e-Navigation. This problem is particularly exacerbated in the case of satellite detection of AIS signals.

Although AIS was developed as a self-organizing system within a local radius, AIS signals can also be detected using low earth orbit (LEO) satellites. LEO satellites have a large field of view (FOV), typically measured in thousands of nautical miles, which means that the LEO satellite may receive signals from large numbers of ships at once. Due to the large FOV, the self-organizing features of AIS are not sufficient to prevent signal collisions in this scenario. As a result, LEO satellite reception leads to a large number of AIS signals colliding or overlapping with one another.

Moreover, many AIS signals may not be transmitted with sufficient power to be received without error at an LEO satellite. AIS Class A transmitters, such as those aboard large commercial vessels, have a transmit power level of 12.5 W, by default, which may not be sufficient to overcome noise or signal collisions in many cases. However, AIS Class B transmitters, which can be found on small vessels, have less sophisticated transmitters limited to a power level of just 2 W and which transmit infrequently, making their detection difficult in areas with a high vessel density and significant AIS traffic. The large footprint of a satellite receiver can further complicate detection.

Nevertheless, the population of small vessels is continuing to grow on the VDL. Small vessels are of particular interest to security organizations as their ownership and purposes within national waters can be difficult to trace given that they operate outside the IMO and the SOLAS conventions. It is desired to use AIS, and LEO satellite detection, to track these vessels but their low power and infrequent transmissions make it very difficult to detect these vessels, particularly in congested areas.

The described embodiments are generally directed to generating and transmitting e-Navigation (e.g., AIS) signals with a compatible message format that encodes a position history, allowing for a vessel track to be determined even if relatively few transmitted messages are successfully received and decoded. By transmitting a recent track history, even small vessels can be monitored even when a large number of their position reports are lost in a noisy environment, or otherwise fail to be received and processed by a monitoring system. However, the described concepts are generally applicable to both AIS Class A and Class B transceivers.

In addition, other techniques can be used to significantly improve the likelihood of reception even when transmitted at low power, such forward error correction coding and the like.

The described embodiments can be provided in such a way as to be compliant with existing AIS standards, and backward compatible with conventional AIS data communications transponders, such as used and defined within the AIS standard, and in evolving e-Navigation standards.

It will be appreciated that although the example embodiments herein are described with reference to AIS, the described concepts may also be applicable to other e-Navigation standards. Moreover, certain aspects (e.g., modulation scheme) of AIS and e-Navigation may be modified in the future.

Similarly, the described concepts may also be applicable to other position tracking systems, including but not limited to motor vehicle tracking over land, rail car tracking, aircraft tracking and others.

Referring now to FIG. 1, there is shown a simplified schematic diagram of an example e-Navigation system 100. System 100 has at least one LEO satellite 150, which receives e-Navigation message signals transmitted by one or more ship-based transmitters 110, one or more small vessel transmitters 115, and other transmitters, such as a ground-based transmitter 120. LEO satellite 150 can transmit data corresponding to the received message signals to a ground station 180. In some embodiments, LEO satellite 150 may perform post-processing and recovery of the received message signals on-board. In other embodiments, LEO satellite 150 may retransmit raw signal data to one or more ground stations 180 for post-processing and recovery.

In embodiments where e-Navigation employs AIS-based communications, a given Class A ship transmitter 110 will typically transmit AIS signals over a number of narrowband (i.e. 25 kHz) VHF channels. Examples of AIS VHF channels include AIS1 at 161.975 MHz and AIS2 at 162.025 MHz. To transmit an AIS signal, the transmitting unit employs a 9.6 kbps Gaussian minimum shift keying (GMSK) modulation.

Similarly, a Class B ship transmitter 115 will transmit AIS signals using CSTDMA or SOTDMA over VHF channels using an appropriate modulation and coding.

As noted above, other AIS channels also exist and may be used, and still further channels—which may use varying access schemes, modulation types and channel bandwidth—may be added globally or regionally from time to time, in order to facilitate e-Navigation or maritime communication services. The present embodiments may be used with any combination of channels.

The LEO satellite 150 is equipped with at least one VHF antenna and receives the AIS signal transmitted by the transmitter 110 or transmitter 115. The LEO satellite 150 travels at a high orbital velocity, such as 7,500 m/s for example, and consequently the AIS signal received by the LEO satellite 150 may undergo a Doppler shift of up to +/−5.0 kHz.

In the embodiments described herein, transmitters 110, 115 and 120 may generate and transmit AIS signals as described with reference to FIGS. 5A and 5B.

Received AIS signals may be filtered and pre-processed using known techniques for receiving AIS messages. For example, the received AIS signal may be narrowband filtered to isolate the AIS channels of interest. The receiver may then attempt to identify a candidate message in the signal data, for example by locating an AIS training sequence in the signal data.

Once a candidate message is identified, GMSK demodulation may be performed followed by Non-Return to Zero Inverted (NRZI) decoding, bit de-stuffing and bit reversal to recover the AIS message bit sequence.

The AIS message cyclic redundancy check (CRC) code may be verified at this stage, to determine if any errors are present in the recovered AIS message bit sequence. Conventionally in AIS message processing, if the CRC verification fails, the message data is discarded. However, in the embodiments presented here, processing can continue even in the presence of one or more bit errors in the AIS candidate message. Accordingly, the top level CRC verification may be omitted in some embodiments described herein.

Once the AIS message bit sequence is recovered, the system proceeds to payload processing for each AIS message bit sequence, as described with reference to FIG. 8.

Figure 2:
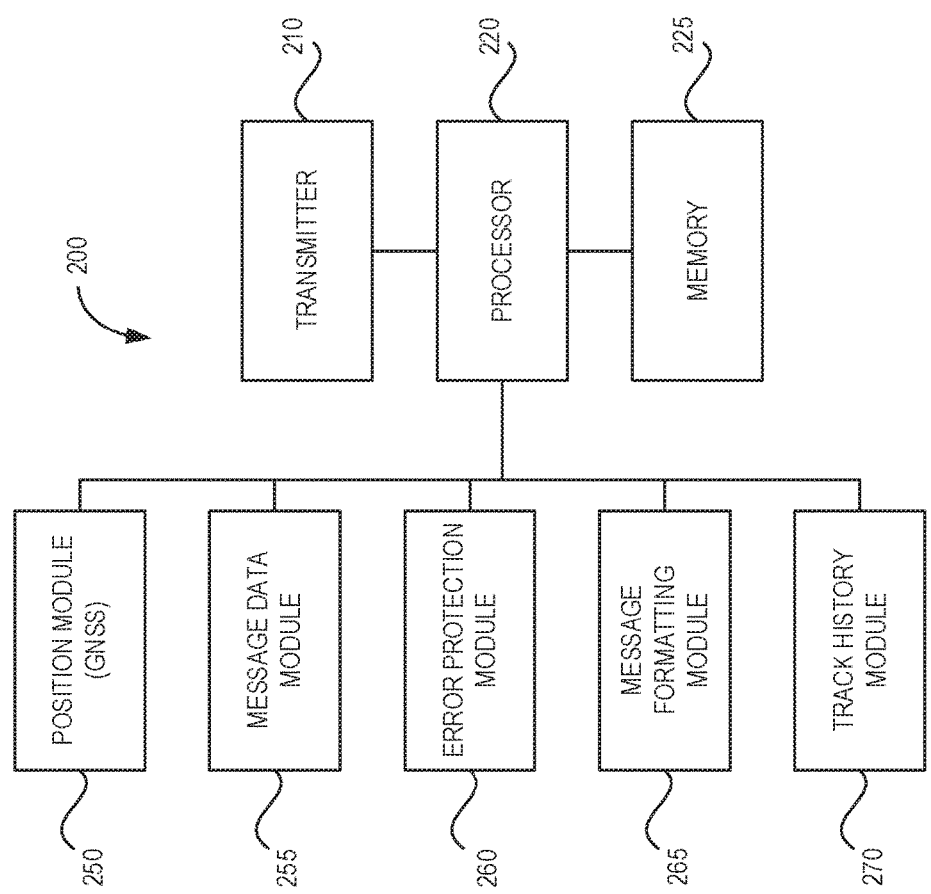
FIG. 2 is a system block diagram of an example e-Navigation transmitter for the system of FIG. 1.

Referring now to FIG. 2, there is illustrated a system block diagram for an e-Navigation transmitter in some example embodiments. E-Navigation transmitter 200 may be used in ship transmitter 110, small vessel transmitter 115 and ground transmitter 120, for example.

Transmitter 200 includes a processor 220, memory 225 (which may include volatile and non-volatile memory) and an RF transmitter stage 210. RF transmitter stage 210 includes one or more amplifiers, filters and antennas, for example, used to transmit an AIS message signal. In some embodiments, RF transmitter stage 210 operates at low power levels (e.g., AIS Class B standard power level of 2 W, or less). In some other embodiments, RF transmitter stage 210 may operate at AIS Class A power levels (e.g., 12.5 W).

Processor 220 may be a general purpose microprocessor or micro-controller, field programmable gate array, application specific processor, or other computing device. Processor 220 can be configured to perform various tasks, such as monitoring position data from position module 250, determining navigational status, generating maneuver indications, maintaining historical course information (e.g., stored in memory 225). It will be appreciated that processor 220 can perform various other tasks dependent on available or installed software. Based on these tasks, processor 220 can generate message data for transmission in an e-Navigation message. Message data need not be limited to AIS position reports, and may include any free-form data usable in e-Navigation.

Transmitter 200 further comprises a position module 250, a message data module 255, an error protection module 260 a message formatting module 265 and a track history module 270. In some embodiments, various modules, such as error protection module 260 and message formatting module 265, or position module 250 and track history module 270, may be combined into a single module, or may be divided into various sub-modules.

Position module 250 is a receiver for a global satellite navigation system (GNSS), such as the Global Positioning System (GPS), Galileo, or the Global Navigation Satellite System (GLONASS). In some cases, position module 250 may instead be a cellular, FM-radio based, inertial-based or other type of position determination device. Position module 250 is generally capable of determining a present location of transmitter 200 and a current time, and supplying this data to processor 220.

Message data module 255 receives message data from processor 220 and generates binary payload data, based on the received message data, for inclusion in an AIS signal transmission.

Error protection module 260 receives the binary payload data and encodes the binary payload data using at least one error protection scheme as described with reference to FIG. 7.

Message formatting module 265 receives the encoded binary payload data and encapsulates the encoded binary payload data in a message wrapper for transmission, as described with reference to FIG. 7. For example, the message wrapper may be a properly-formatted AIS ASM. In some embodiments, other parts of the message may be encoded in addition to the binary payload portion. In some embodiments, all data in the message, with the except of a synchronization 'preamble' or training sequence may be encoded.

Track history module 270 receives message data from position module 250 or processor 220, and can generate a track history based on the available message data, as described with reference to FIG. 7.

In some embodiments, transmitter 200 may provide an enhanced level of message detection compared to standard AIS Class B transmitters (at the same RF power level) in the presence of: other AIS transmitters, or in areas with a high density of like messaging transmitters.

Even where some messages are not detected successfully, the inclusion of track history in e-Navigation messages facilitates the continuous monitoring of vessels.

Transmitter 200 can be compatible with existing AIS modulation, channelization, message standards and signaling protocols, and relatedly no new modulation scheme or digital baseband circuitry is required for the transceiver.

Transmitter 200 has low processing load requirements to encode messages. Thus microcontrollers can be used, avoiding the need for advanced processors and/or floating point calculations.

Transmitter 200 can be configured for different types of behaviors at the factory or in the field via a firmware upgrade. Accordingly, transmitter 200 can be configured to operate in a 'closed' system, in which all e-Navigation messages it sends are proprietary. Alternatively, transmitter 200 can operate in a hybrid mode, by providing some or all enhanced features to a compatible network (ground, satellite, etc.) infrastructure, while still occasionally transmitting standard AIS position reports as required. Such behavior can be dedicated respectively to different channels (e.g., AIS ASM1, ASM2, etc.), or the hybrid mode can be employed on a single or pair of channels (such as standard AIS frequencies).

Moreover, the behavior of transmitter 200 can optionally be modified over time via over-the-air programming (e.g., using e-Navigation messages or AIS ASMs for this purpose), or over another wired or wireless link (e.g., Wi-Fi or USB).

Figure 3:
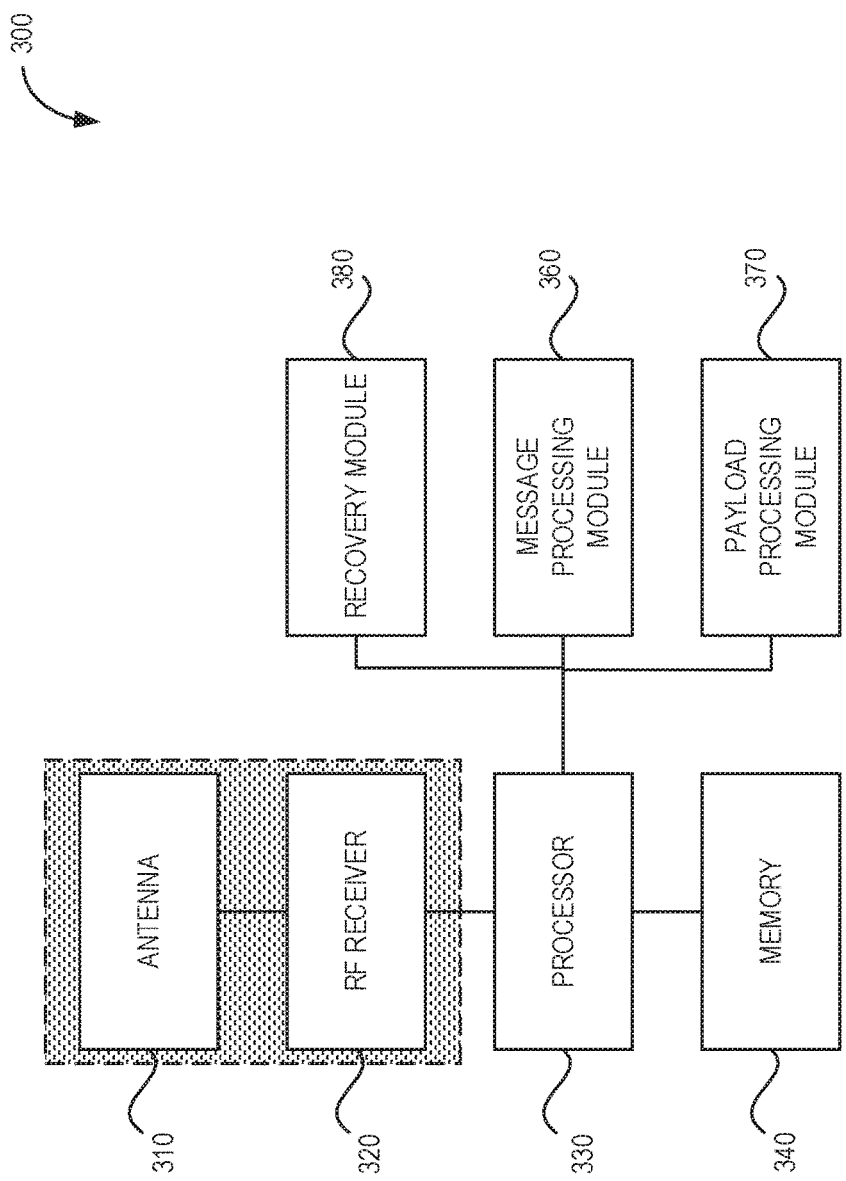
FIG. 3 is a system block diagram of an example e-Navigation receiver for the system of FIG. 1.

Referring now to FIG. 3, there is illustrated a system block diagram for an e-Navigation receiver in some example embodiments. E-Navigation receiver 300 may be used in LEO satellite 150 or ground station 180, for example.

Receiver 300 includes a processor 330, memory 340 (which may include volatile and non-volatile memory), one or more antennas 310, and an RF receiver stage 320.

Receiver 300 further includes a message processing module 360, a payload processing module 370 and a recovery module 380. In some embodiments, message processing module 360 and payload processing module 370 may be combined into a single module, or may be divided into various sub-modules.

Processor 330 may be a general purpose microprocessor, field programmable gate array, application specific processor, or other computing device. Processor 330 can be configured to control the operation of the various modules, and to receive and further process message data recovered from e-Navigation signals.

RF receiver stage 320 includes one or more filters and amplifiers to pre-process signal data received by antenna 310. Pre-processed signal data is provided to message processing module 360, which identifies candidate message signals and performs GMSK demodulation followed by Non-Return to Zero Inverted (NRZI) decoding, de-stuffing and bit reversal to recover input signal data, for example an AIS message bit sequence.

Payload processing module 370 receives the input signal data and may, in some cases, extract the binary payload encapsulated within a message wrapper. Payload processing module 370 can then decode any error protection encoding schemes of the binary payload to recover message data.

Messages that are not successfully decoded may be passed to recovery module 380, which may store them in memory 340 for later processing. If multiple messages are received within a Burst Sequence, as described herein, recovery module 380 may retrieve a plurality of messages for the burst sequence, and perform recovery processing to identify a message that can be successfully decoded. For example, a "voting" procedure can be used, wherein bits that occur most frequently are selected. Repeated messages may also be summed, or a weighted "voting" procedure used for each bit, to generate a composite message that may have fewer bit errors, and which can be successfully decoded.

Figure 4A:
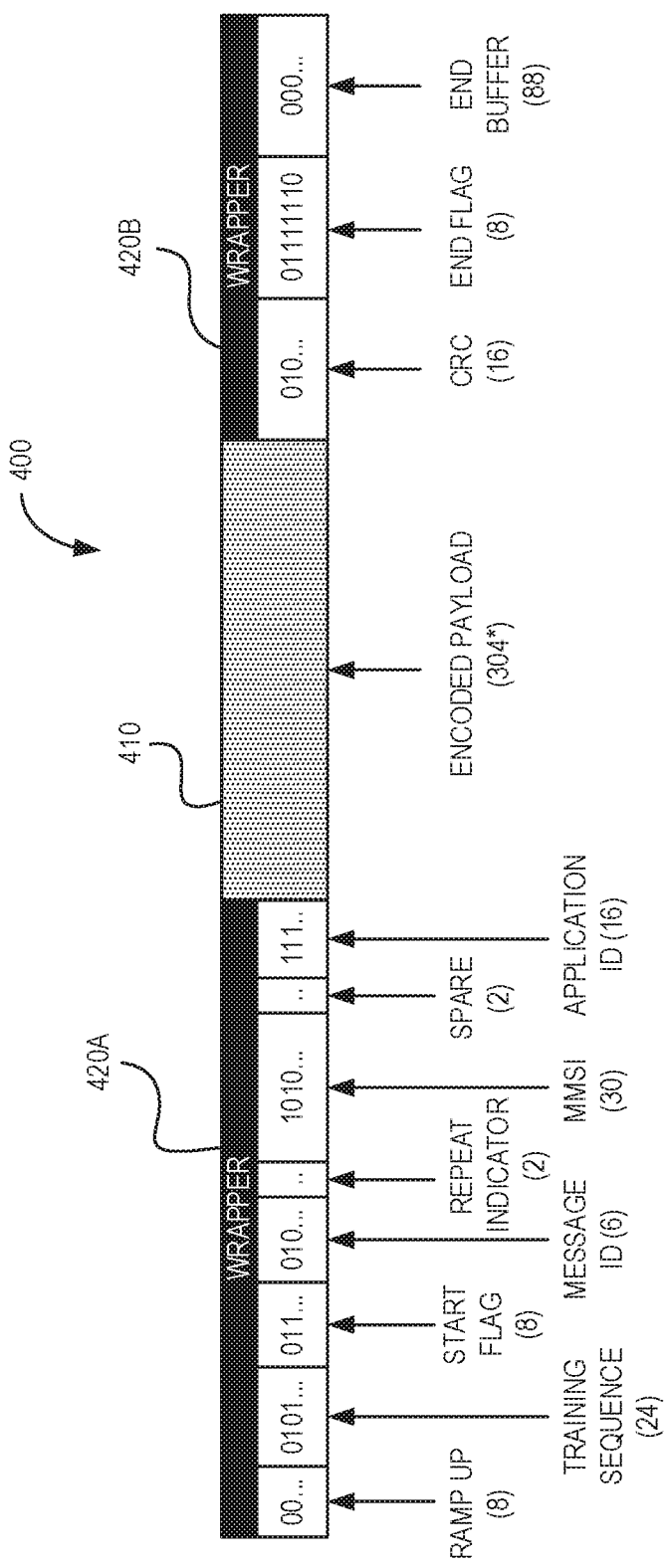
FIG. 4A is a diagram illustrating the data structure of an example e-Navigation message signal.

Referring now to FIG. 4A, there is shown a diagram illustrating the data structure of an example e-Navigation message signal 400. The AIS message signal 400 generally comprises a binary payload portion 410 encapsulated within a message wrapper. The message wrapper is illustrated as having a first wrapper portion 420A that precedes the binary, encoded payload portion 410 in the message bit sequence, and a second wrapper portion 420B that follows the binary payload portion 410 in the message bit sequence. For ease of understanding, the first wrapper portion 420A and second wrapper portion 420B are collectively referred to herein as the message wrapper 420.

The message length of standard AIS messages is subject to some constraints based on bit rate (i.e., 9.6 kbps) and slot length (i.e., 26.67 ms), however longer messages may be still be transmitted by using two or more slots in the AIS system. In the example embodiments set out herein, the e-Navigation message is limited to 512 bits in length, which corresponds to two slots. However, in some cases, an e-Navigation message may occupy fewer or more than two slots. For example, by reducing the number of history points or eliminating them, a message may occupy only one slot. In addition, an e-Navigation message may occupy fractional time slots, for example one and a half time slots, and still be a valid AIS message.

Message wrapper 420 contains fields required to form a valid, standards-compliant AIS message; an example of a Type 8 AIS message is shown in Table 1 below. For example, an initial offset or ramp up field (8 bits), an AIS training sequence (24 bits), and a start flag (8 bits). A message identifier (6), repeat indicator (2), Maritime Mobile Service Identity (MMSI) (30 bits), spare field (2 bits) and application identifier (16 bits) may also be included. Finally, a frame check sequence (e.g., CRC) field, a buffer field or bit stuffing and a stop flag may be included to complete the AIS message.

TABLE 1

| Field | Number of bits |
| --- | --- |
| Initial Transmit offset bits | 8 |
| Preamble/training sequence | 24 |
| Start Flag | 8 |
| Message ID | 6 |
| Repeat Indicator | 2 |
| MMSI | 30 |
| Spare | 2 |
| Application ID | 16 |
| Encoded Payload | 304* |
| | *152 decoded bits when using FEC at rate 1/2 |
| Full Message CRC | 16 |
| Stop Flag | 8 |
| End Buffer (bit stuffing) | 88 (or less for bit stuffing) |
| Total | 512 |

Depending on the type of message, a different wrapper may be used. For example, an AIS Type 25 or Type 26 may have a modified wrapper, to suit the different message parameters. The described approach can be applied to many different message types, including but not limited to message types defined in the future as new protocols are defined.

The AIS training sequence field is included to allow conventional AIS receivers to perform carrier recovery. The training sequence field, the start flag field and the stop flag field are predetermined AIS code sequences that can be used to identify candidate message signals in a data stream.

The message identifier is a standard AIS message identifier, such as a message identifier signifying a Type 8 message, which is defined in the AIS standard for miscellaneous use.

A Repeat Indicator can be used to indicate the number of times an identical message has been transmitted.

A Spare field can be defined for future use, for example.

An Application ID, which is similar to a message identifier, can be used to define message sub-types. For example, it may define sub-types of a Type 8 message. In general, a unique Application ID can be assigned to all new and predefined message sub-types for a particular message identifier (e.g., Type 8 (binary) messages). For example, the e-Navigation messages as described herein may have a unique Application ID. If a new message format is defined, then a different Application ID may be used.

The CRC check sequence field is used for error detection of the full message (as opposed to the binary payload alone), and can be used to determine whether bit errors are present in the overall AIS message following transmission and reception. The end buffer field may change in length and is used to ensure that the overall AIS message signal length remains constant regardless of the number of bits added due to bitstuffing In general, the binary payload 410 may contain predetermined free-form data of any type. In the example embodiments, the binary payload 410 can be sub-divided into a plurality of pre-defined fields as described herein.

Figure 4B:
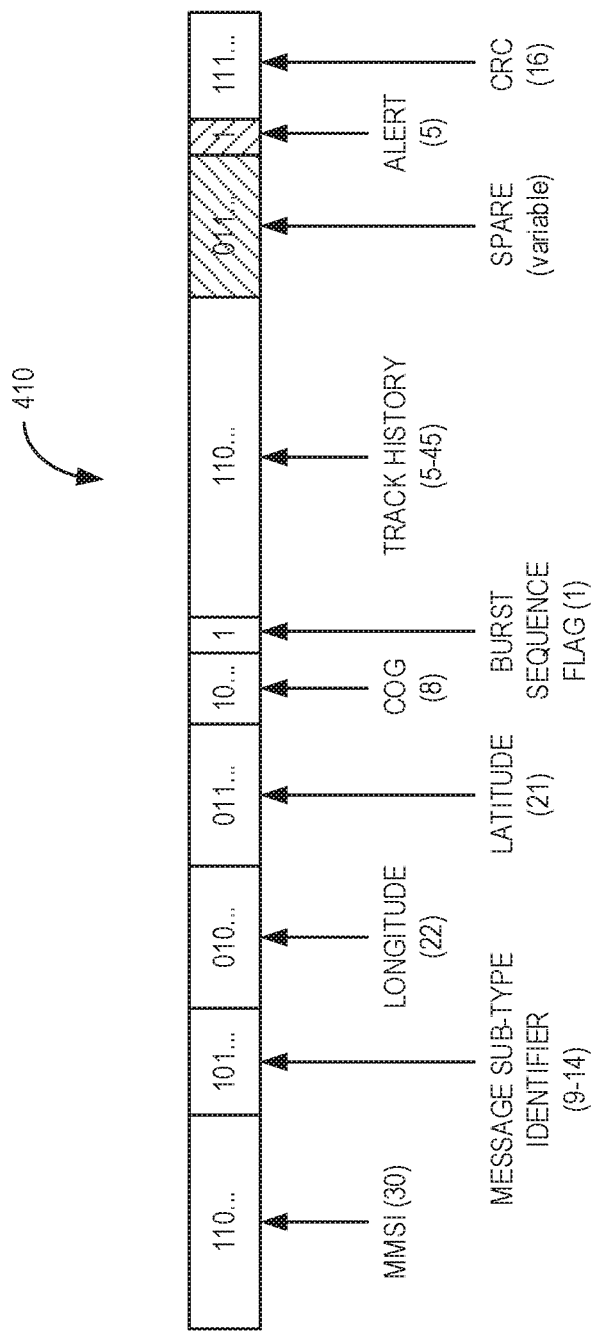
FIG. 4B is a diagram illustrating the data structure of the payload of the example e-Navigation message signal of FIG. 4A.

FIG. 4B is a diagram illustrating the data structure of the binary payload 410, without forward error correction coding. The binary payload 410 contains:
MMSI
Message sub-type identifier
Longitude
Latitude
Course over Ground (COG)
Burst Sequence Flag
Track History
Spare bits (if necessary)
Alert Flags (when possible)
Payload-level CRC for the unencoded/decoded binary payload In the example embodiments, the field order does not change and adheres to the pattern above. In alternative embodiments, other orders or variable orders may be used. In the example embodiments, most fields in the unencoded payload are variable in length, with the exception of MMSI, which is 30 bits in length. Other embodiments may use a shorter or longer unique identifier instead of the MMSI commonly used in e-Navigation. However, in some alternative embodiments, one or more other fields may be fixed in length. Fields that are similar to standard AIS position reports may have differing levels of numerical precision and or encoding method, such as the longitutude and latitude field proposed in the embodiments described herein. In the described embodiments, the resolution is decreased from AIS position report levels to reduce data volume, which is acceptable for positional tracking purposes, as opposed to collision avoidance. Adjustments in the precision and types of fields presented can be made to meet the needs of the intended application.

In some embodiments, one or more of these fields may be omitted, while in other embodiments, additional fields may be added. It can be seen that the binary payload 410 may omit certain fields found in an AIS position report, such as radio status. However, certain fields may be repeated or redundant (e.g., MMSI) to those found in the wrapper, and new payload fields may be added. A payload CRC field may also be provided, that provides a check on the unencoded or decoded data of the binary payload 410.

The payload message format is determined by the message sub-type identifier in the payload. The message sub-type identifier may be variable in length and in the example embodiments varies between a minimum of 9 bits and a maximum of 14 bits. In particular, the message sub-type identifier may have 9 bits when a complete track report of nine track history points is present (although in some embodiments fewer or more than nine track history points may be present). Some other operating modes may also allow for a 9-bit message sub-type identifier. When an incomplete or partial track history is present, the message sub-type identifier may be up to 14 bits in length.

In some example embodiments, the first bit of the message sub-type identifier defines whether or not the message is a "regular" message that contains a complete track history, with a predefined field order. For example, the first bit (e.g., most significant bit) may be 1 for complete track history, and 0 otherwise.

If the message is a regular message with a complete track history, the remaining eight bits of the message sub-type identifier may be a point layout selection index to select— from a predefined list—the appropriate predetermined point layout or point layouts for representing the track history contained in the message, as described herein. These eight bits can represent up to 256 different predetermined point layout possibilities that can be placed in the predefined list with a variety of different precisions. In practice, fewer than all 256 possible point layouts need be defined. For example, combinations of 5-bit and 9-bit precision point layouts can be defined among the 256 possibilities. For any given generated message, only a single point layout need be used to encode all the historical position points (track), although the selected point layout can change from message to message.

Accordingly, more recent history points can be defined with greater precision (e.g., 9-bit), while older history points can be defined with lesser precision (e.g., 5-bit). This may allow for additional history points to be included in the message.

In some cases, the last (oldest) history point may use a different predefined time duration, or even point layout. For example, in addition to the track history defined above, with, e.g., 6 historical positions at 30 minute intervals for a 3 hour history, a final history point may be added that is more distant in the past (e.g., 6 hours back) on a fixed, large spaced point layout (which may have higher error). In some other cases, a variable time interval may be chosen, in which older history points are progressively further apart. In still other embodiments, variable time intervals may be chosen to increase temporal resolution closer to course changes and to decrease temporal resolution when course is maintained relatively constant. In some embodiments, constant time offsets that are staggered between adjacent messages may also be used (e.g., using a 1-hour interval in a first message, with the track history offset by 30 minutes in each subsequent new message).

The point layout selection index values may be extracted from the message sub-type identifier and converted to unsigned integers with the most significant bit being the first bit (e.g., 1010 0000 is 160).

For a regular message with a complete track history, the bit allocation for the unencoded binary payload can be as shown in Table 2 below:

TABLE 2

| Field | Bits |
| --- | --- |
| MMSI | 30 |
| Message sub-type identifier | 9 |
| Longitude | 22 |
| Latitude | 21 |
| Course Over Ground | 8 |
| Burst Sequence Flag | 1 |
| Track History | 45 |
| Payload CRC | 16 |

In the example embodiments, the Longitude and Latitude fields contain longitude and latitude values for a current position report, as determined by an onboard GNSS receiver or other device. The current position may be the instantaneous position of the vessel being tracked at the time the message is generated. In other cases, the current position may be the most recent position or self-anticipated position at one of a number of prescribed time intervals within each hour of the day. For example, all positions may use the convention of the position of the vessel in the most recent 10 minute mark from the start of the hour, i.e., 0:00:00, 0:10:00, 0:20:00, etc. (h:mm:ss), rather than the current position. Such a method would produce positional and historical vessel positions at synchronized times, regardless of the actual time slot used to transmit the message, and would permit a higher fidelity representation of relative vessel positions in a crowded environment than a combined chart showing vessels at staggered times (and hence positions).

Longitude values may be stored as signed integers. With 22 bit precision, this allows for representing values between −180 and +180 in increments of 1/190 of a minute (with East as positive direction).

Similarly, latitude values may be stored as signed integers. With 21 bit precision, this allows for representing values between −90 and +90 in increments of 1/190 of a minute (with North as positive direction).

Other increments and coding are possible, for example if the available bit depth is restricted or expanded.

The Course Over Ground may be an unsigned integer. With 8 bit precision, the COG may be delineated in 360/256 (i.e., 1.40625) degree increments.

The Burst Sequence Flag is a field (in the example embodiments, a 1-bit field) that may be used to identify the current "burst sequence" or window for the current message. In the example e-Navigation message transmission protocol, messages are generated once per burst sequence, and then fixed for all subsequent retransmissions, every two minutes, within a burst sequence. This enhances the opportunity for a receiver to successfully receive at least one message within the burst sequence, for example, in a noisy environment. This also reduces the power and complexity requirements for the encoder, since there is no need to recomputed Track History for every re-transmission.

In some example embodiments, messages with a common Track History (i.e., those within a single Burst Sequence) can be sent five times in a 10-minute period, for example. Other implementations are also possible.

Accordingly, since the historical points are all at predetermined time boundaries, even a message sent or received, for example, at 28 minutes past the hour can be known to come from a position fix taken at 20 minutes after the hour (as is every messages at 22, 24, 26 and 28 minutes).

As each of these multiple messages may be identical, reception can be improved. However, if any one of the messages is decoded error free (e.g., the payload CRC check indicates a valid message), then repeated messages can be ignored. If, however, none of the CRC checks for multiple repeated messages, indicate a valid message, it may nevertheless be possible to successfully extract a message by applying combined decoding techniques.

For example, repeated messages may be non-coherently averaged or a weighted "voting" procedure used for each bit, to generate a composite message that may have fewer bit errors, and which can be successfully decoded.

In practice, the Burst Sequence Flag is toggled at the beginning of each new burst sequence (e.g., every 10 minutes). That is, if the Burst Sequence Flag is initially set to 0, it will switch to 1 after 10 minutes have elapsed, and back to 0 after another 10 minutes. In some embodiments, the burst sequences may be aligned with time boundaries, such as 0, 10, 20, 30, 40 and 50 minutes past each hour.

Use of the Burst Sequence Flag prevents a possible message timing error that could occur if there are time differences between the AIS transceiver and the receiving satellite that cross a predefined time boundary. Such differences can arise due to computation time required by the AIS transceiver, signal propagation time, timing offsets between AIS transceiver and satellite, and errors in clocks used to time-stamp received signals or messages, and otherwise.

In an example embodiment, the Burst Sequence Flag is toggled when the current time reaches 0, 10, 20, 30, 40 and 50 minutes past each hour.

In the event of a received message, the Burst Sequence Flag can be used to correctly associate the received message with a burst that was transmitted in the correct 10 minute segment (correction of an error in the received message time stamp of up to +/−5 minutes may be realizable).

Track History is described further elsewhere herein.

Payload CRC is a checksum for only the payload portion of the message. The Payload CRC may be generated using the same algorithm as the Full Message CRC generated for the wrapper of the message. However, in other embodiments, the Payload CRC may be generated using any other suitable algorithm, and may comprise any number of bits. In the example embodiments, 16 bits are used.

A partial track history message may be provided anytime a track history contains fewer than 5 track history points for a 9-bit precision message point layout, or fewer than 9 track history points for a 5-bit precision point layout. This may occur, for example, if a transceiver has been recently powered on, or if other data is desired to be included in the message (e.g., alert flags). If the bit precision of a point layout is other than 5 or 9 bits, or the bit precision changes with historical time, partial track histories can be used when the available track history (e.g., in memory 270) is shorter than the number of points required to fill the track history report.

For a partial track history message, the bit allocation for the unencoded binary payload can be as shown in Table 3 below for 5-bit precision:

TABLE 3

| Field | Bits |
| --- | --- |
| MMSI | 30 |
| Message sub-type identifier | 14 |
| Longitude | 22 |
| Latitude | 21 |
| Course Over Ground | 8 |
| Burst Sequence Flag | 1 |
| Track History | 5 to 40 |
| Spare | Variable |
| Alert Flags (optional) | 0 or 5 |
| CRC | 16 |

For a partial track history message, the bit allocation for the unencoded binary payload can be as shown in Table 4 below for 9-bit precision:

TABLE 4

| Field | Bits |
| --- | --- |
| MMSI | 30 |
| Message sub-type identifier | 13 |
| Longitude | 22 |
| Latitude | 21 |
| Course Over Ground | 8 |
| Burst Sequence Flag | 1 |
| Track History | 9 to 36 |
| Spare | Variable |
| Alert Flags (optional) | 0 or 5 |
| CRC | 16 |

As noted above, when an incomplete or partial track history is present, the message sub-type identifier may be up to 14 bits in length. For a 5-bit precision message, the message sub-type identifier may be 14 bits in length. For a 9-bit precision message, the message sub-type identifier may be 13 bits in length.

The first two bits of the message sub-type identifier can be set to 0, to distinguish over a complete track history message.

As with a regular message with complete track history, the next 8 bits may be a point layout selection index to select the appropriate predetermined point layout for the track history contained in the message. These indices and point layouts may be the same as those used in a full track history.

If the selected precision is 9-bit, the next 3 bits of the message sub-type identifier represent the number of track history points created for the partial track history contained in the message (i.e., 0 to 4), resulting in a total length of 13 bits for the message sub-type identifier. Similarly, if the selected precision is 5-bit, the next 4 bits of the message sub-type identifier represent the number of track history points created for the partial track history contained in the message (i.e., 0 to 8), for a total length of 14 bits.

The Spare field can be used to pad or bitstuff the payload to maintain a fixed length. Generally, the length of the Spare field will be determined by the number of track history points in the partial history message, and whether or not an alert is set.

For example, for a 5-bit precision message, the length of the Spare field can be determined by the following formula:

$$L=(A+7-N)*5$$

where L is the length in bits, N is the number of track history points. A is 0 if an alert is set, and 1 otherwise.

Similarly, for a 9-bit precision message, the length of the Spare field can be determined by the following formula:

$$L=(4-N)*9+A*5$$

where L is the length in bits, N is the number of track history points. A is 0 if an alert is set, and 1 otherwise.

Although the described embodiments refer to 5-bit and 9-bit precision, other bit precisions are possible. For example, a 4-bit precision or 8-bit precision could also be used, with appropriate modification of the described embodiments. A partial track history message can also be selected even when there are sufficient history points in memory, to permit usage of above spare bits for additional information, as described in further detail below.

The Alert Flags field may be used for partial track histories that have 7 or fewer track history points for 5-bit precision messages or that have 4 or fewer track history points for 9-bit precision message. If more track history points are present, the alerts may be unset or omitted. If an alert flag is set when there are 8 or more track history points (for 5-bit history) or 5 track history points (for 9-bit history), the message sub-type identifier can indicate that the number of track history points reported is 7 or 4 (depending on the point layout bit depth) and include the alert flags field with the appropriate flags set.

In some embodiments, the Alert Flags field may be made larger, particularly where different bit precisions are used for the Track History. For example, with 45 bits available in the Track History field, if a bit depth of only 8 bits is used, only 40 of 45 bits can be used for Track History. Accordingly, the remaining bits of the Track History field can be allocated for use as alert flags.

Similarly, the Spare field can also be allocated for use as alert flags in some embodiments.

Alert Flags are toggle bits that may be used to indicate the alert status of the transmitting device. Multiple alerts can occur simultaneously; therefore a bit pattern is used to transmit the complete alert status with each message.

If no alert flags are set the alert status need not be sent and the Alert Flags field can be allocated for use in providing Track History.

An example definition of the alert bits is shown below in Table 5:

TABLE 5

| Alert bit | Description |
| --- | --- |
| 0 | SOS alert |
| 1 | Geofence alert |
| 2 | Bracket alert |
| 3 | Power alert |
| 4 | Reserved for future use |

Alert bit 0 may indicate the SOS status of the vessel (i.e., SOS active or inactive). Alert bit 1 may indicate whether the vessel is outside a geofence that may be predefined for the AIS transceiver. Alert bit 2 may indicate a mounting bracket alert. Alert bit 3 may indicate a low power condition. Alert bit 4 may be reserved for future use.

A bracket alert can indicate a potential security condition. In some cases, transmitters are placed in a dedicated mounting bracket while in use. This bracket may be locked to a specific transmitter (e.g., by a RFID tag or other "keying" device). If the transmitter is removed, or installed in a different bracket, it can be configured to set an alert that indicates this condition.

Other combinations of alert bits are possible. In some embodiments, the Alert Flags field may be enlarged, allowing for still other alert bits to be provided, or for more detailed messages.

In some embodiments, additional flags may be possible to convey AIS transceiver health information (e.g., temperature, battery voltage, firmware version, uptime, etc.), local weather, or other information.

Track History

In the example embodiments, the Track History field will typically have a maximum length of 45 bits, due to limitations in the length of a two-slot AIS message. However, in other embodiments, additional slots, or partial slots may be used to provide additional history data, or greater precision of the history points in time or position.

Several bit precisions are demonstrated in the example embodiments: one in which the history is provided in up to 5 samples with 9-bit precision, and one in which the history is provided in up to 9 samples with 5-bit precision.

Each sample may be an approximation of a previous transceiver location, placed on a predefined point layout which will be known to the AIS satellite receiver (or ground processing station) and can be identified from the message sub-type identifier. The points in a point layout need not be spaced in a Cartesian grid coordinate system. Rather, radial coordinates and other coordinate systems may be used. For example, in some embodiments, the predefined point layout may contain predefined points spaced radially, and identified according to radial and angular components. Still other predefined point layouts can be used, such as predefined shapes, equally sampled per linear length of fractal numbers, discrete cosine transforms (DCT) or Fast Fourier transforms (FFT) layouts based on transformed encodings of 'elemental' shapes, such as straight lines, various curves, ellipses and circles, etc.

Figure 9:
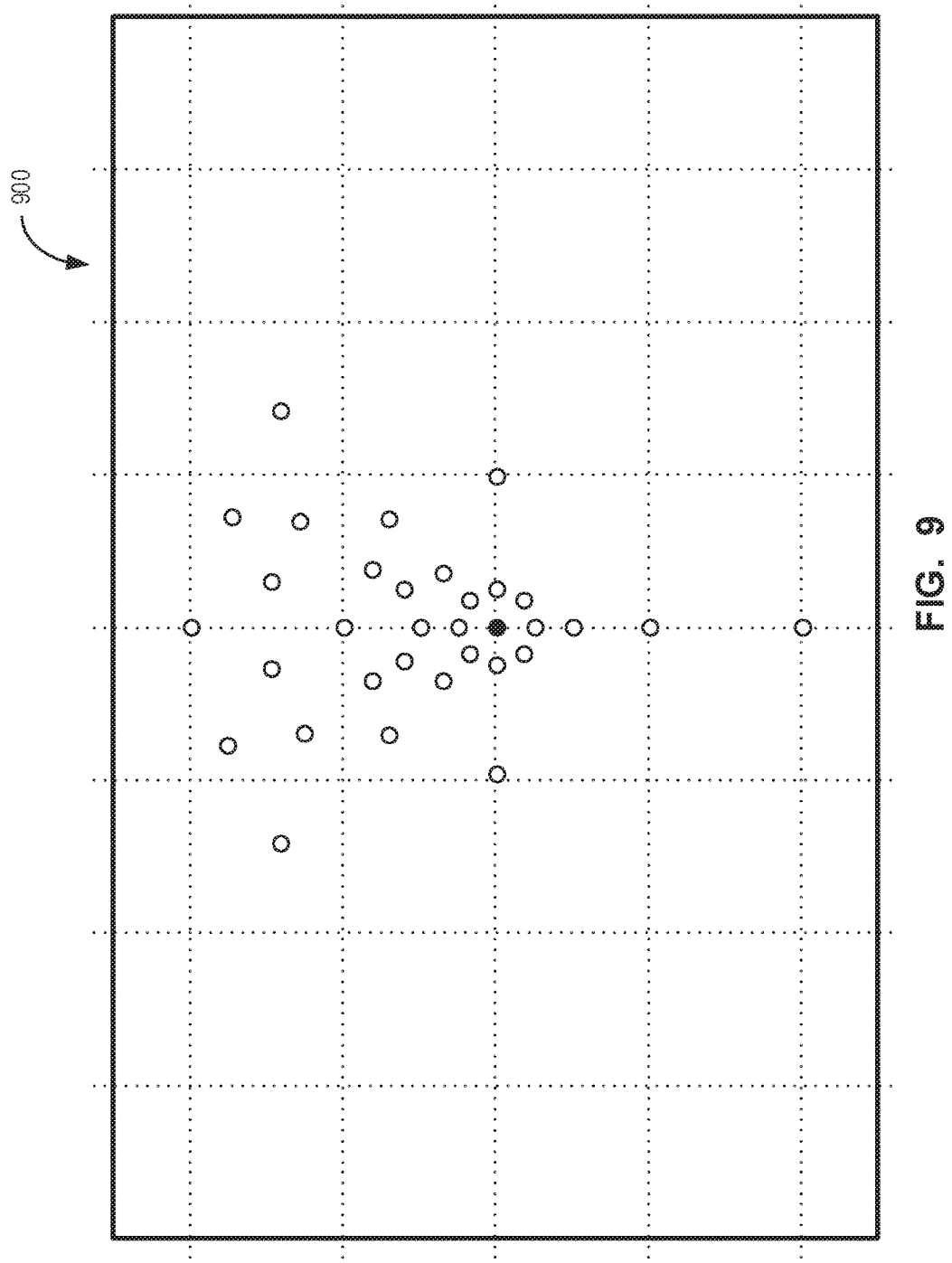
FIG. 9 is a diagram of another example point layout.

Although the examples provided herein generally use the examples of point layouts in which points are spaced according to some ordered or algorithmic approach (e.g., Cartesian grid, concentric circles, etc.), in other cases, there may be point layouts in which points are placed arbitrarily. FIG. 9 illustrates one such arbitrary point layout, in which points are placed according to some automatic or manual tuning process. The arbitrarily placed points can be identified by index values (i.e., a first dimensional component value array index) in similar fashion to the ordered or algorithmically derived point layouts.

In such arbitrarily defined point layouts, it is possible to assign a fixed single point to correspond to no motion, or no change in motion from a previous encoded historical point, or to encode special cases, such as the presence of an alert flag. When used in conjunction with alert flags as described above, particular points may be used to indicate at which point in a history the alert had occurred (to within the temporal resolution of the history report). An alternate encoding could use several dedicated points to indicate two or more unique alert status bits within the history report. Both of the latter approaches would provide some temporal information context to alert flags, and may avoid the need for a partial history report to insert an alert flag.

In some cases, the arbitrarily defined point layouts may be combined with ordered or algorithmically defined point layouts to allow the encoding of alert flag tags. For example, a predefined point layout may sacrifice one bit of precision at each point in the layout to be used as an alert flag tag. That is, rather than using 9-bits of precision, only 8-bits may be used, with the remaining 1-bit used as a tag to indicate whether the alert flag applies at that history point.

The exact numerical components of each of the points in a point layout may be defined in a point layout look-up table or tables shared by the AIS transceiver and AIS satellite receiver (or ground processing station), and referenced according to index values for each table entry.

In an example embodiment with 5-bit precision and a radial point arrangement, the radial component may have 2 bits, which allows for 4 potential component values, and the angular component may have 3 bits, which allows for 8 potential component values.

In another example embodiment with 9-bit precision and a radial point arrangement, there may be a variable number of bits ranging from 3 to 6 bits for each of the radial and angular components. The number of bits used for each component may be defined by the specific look-up table used, however, the number of bits per component is fixed within each individual look-up table.

Figure 5:
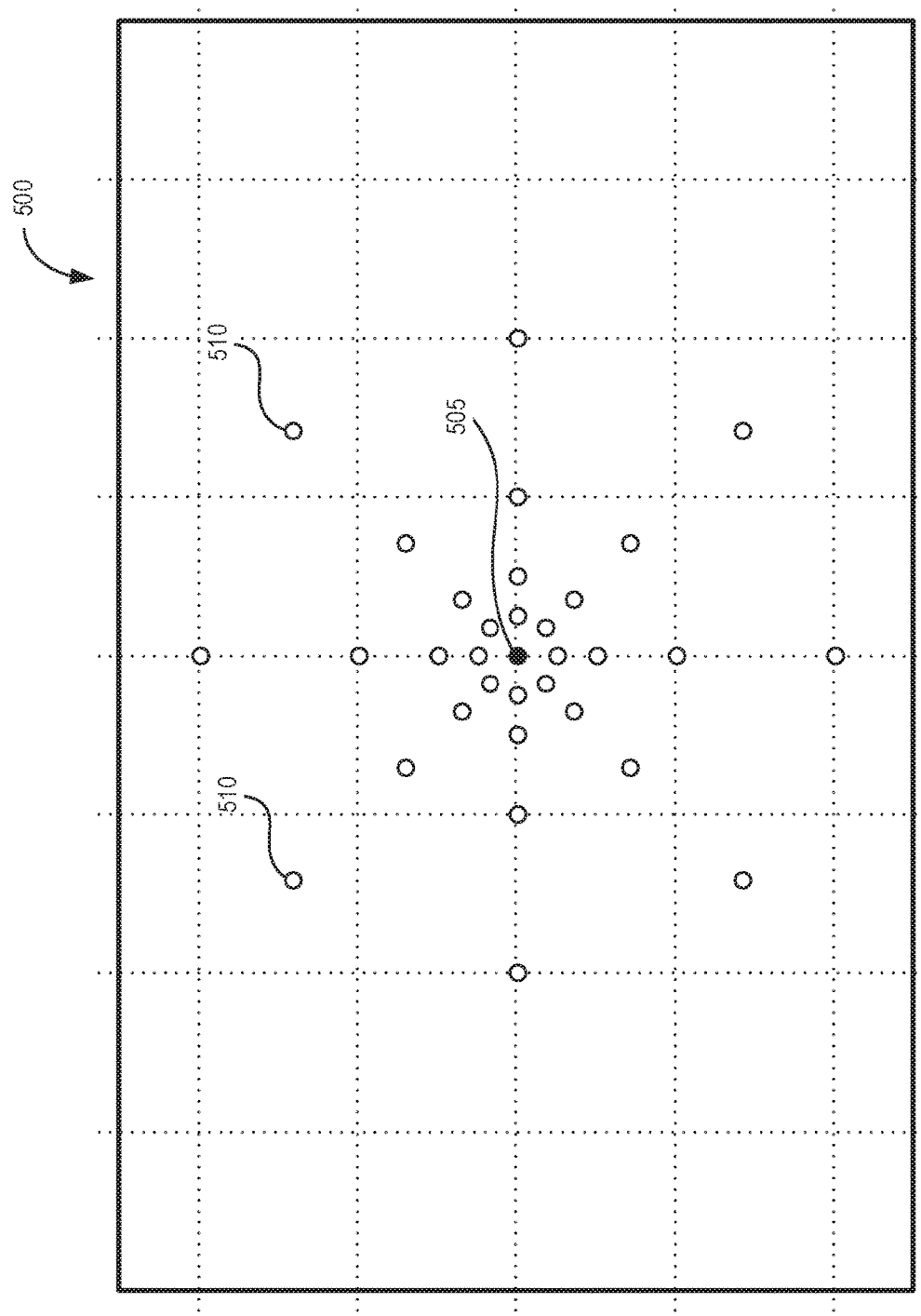
FIG. 5 is a diagram of an example point layout.

Referring now to FIG. 5, there is illustrated an example point layout 500 for a radial point arrangement with 5-bit precision. In the example point layout, the angular components are equally spaced. With 3-bit precision for the angular component, up to 8 different angular components are possible and with equal angular spacing, each of these angular components is 45° from its nearest neighbors. In some other embodiments, variable angular spacing may be used.

The radial components in point layout 500 may be variably or equally spaced. With 2-bit precision for the radial component, only 4 possible radial lengths are possible and in the point layout 500, these are selected as 1, 2, 4 and 8 nautical miles. Various other radial lengths are possible, and examples of other radial component values are shown in Table 7.

The combination of 4 possible radial components and 8 possible angular components combines for up to 32 predefined points 510.

When generating a track history, the currently reported position of the AIS transceiver is chosen as the origin point 505 of the point layout. In the example of point layout 500, this may be the position with a zero radial component. In a Cartesian grid layout, for example, the origin point may be a point with zero value x and y components.

A most recent track history point may be identified next. This most recent point may be identified from a locally-stored log of AIS transceiver positions in a predefined time period. In some embodiments, the most recent point may be identified from a prior AIS message, or even a prior track history position.

In general, the most recent track history point may be determined by finding the predefined point in a predefined point layout that most closely approximates the location of the AIS transceiver at a known time in the past (e.g., along a time boundary, such as on the hour).

In other examples, relative time periods may be selected as 10 or 30 minutes into the past, based on the current time of the message. Accordingly, the most recent track history point will be determined by identifying the predefined point closest to the actual position of the AIS transceiver at either 10 or 30 minutes in the past.

To reduce timing ambiguity, and to reduce the number of bits needed to represent track history points, a requirement may be imposed that only those position reports transmitted along fixed time boundaries, relative to Universal Coordinated Time (UTC) may be used. Thus, the current position may be determined every 10 minutes, relative to UTC, and a new track history computed. Points in the track history may be those points that fall on 30 minute boundaries, relative to UTC. All 10 and 30 minute boundaries may be relative to UTC time.

Since there may be 5 identical messages sent within each 10 minute period (e.g., Burst Sequence), the time from the current time in the generated message to the first track history point can be either 10, 20 or 30 minutes. For example, if the original message in a Burst Sequence falls on a 30 minute boundary, the most recent track history point will be 30 minutes into the past. If the original message in a Burst Sequence falls on a 10- or 20-minute boundary, then the most recent track history point will be 10- or 20-minutes in the past, respectively.

Generally, the first message in a Burst Sequence may be transmitted in the first time slot that falls within a 10-minute boundary (e.g., between 00:00 and 02:00 minutes of a 10-minute window). The next transmission would then occur in the next time slot (e.g., between 02:00 and 04:00 of the 10-minute window). In some cases, a GNSS fix may take some time to obtain, which could result in the time slot for the expected transmission to be missed. For example, if a GNSS fix requires 5 seconds to complete, but the time slot falls at 00:01 after the 10-minute boundary, the completed fix may not be available when the message should be sent.

Accordingly, position fixes may be predetermined in advance of a 10-minute boundary, so that the message is available when needed for transmission.

In order to maximize channel capacity, a time slot randomization routine may be used within each two minute window, resulting in a form of random access time division multiple access (RA-TDMA). For example, each transmitter may employ an algorithm to select the time slot to be used, in which the selected time slot is determined based on the MMSI of the transmitter. In subsequent two-minute windows, different time slots may be selected, again based on the MMSI, thus avoiding the problem of always selecting the same time slot as a nearby transmitter and the resulting signal collisions. Various approaches can be used to provide randomization, such as using the last digit(s) or performing some form of CRC check on the MMSI to determine an amount of slots to jump.

Table 6 illustrates the relation between message time and track history point times for a one hour period beginning at 12:00 UTC, on one example embodiment.

TABLE 6

| | Message Time | | | | | |
|---|---|---|---|---|---|---|
| | 12:00 | 12:10 | 12:20 | 12:30 | 12:40 | 12:50 |
| Track History 1 | 11:30 | 12:00 | 12:00 | 12:00 | 12:30 | 12:30 |
| Track History 2 | 11:00 | 11:30 | 11:30 | 11:30 | 12:00 | 12:00 |
| Track History 3 | 10:30 | 11:00 | 11:00 | 11:00 | 11:30 | 11:30 |
| Track History 4 | 10:00 | 10:30 | 10:30 | 10:30 | 11:00 | 11:00 |
| Track History 5 | 9:30 | 10:00 | 10:00 | 10:00 | 10:30 | 10:30 |
| Track History 6 | 9:00 | 9:30 | 9:30 | 9:30 | 10:00 | 10:00 |
| Track History 7 | 8:30 | 9:00 | 9:00 | 9:00 | 9:30 | 9:30 |
| Track History 8 | 8:00 | 8:30 | 8:30 | 8:30 | 9:00 | 9:00 |
| Track History 9 | 7:30 | 8:00 | 8:00 | 8:00 | 8:30 | 8:30 |

It will be appreciated that various other time intervals or time boundaries may be used. In some alternative embodiments, timing information may be incorporated into the binary payload itself.

For example, in another approach, the time offset for the track history may alternate between neighboring Burst Sequences. For example, Burst Sequences that begin at 0, 20 and 40 minutes past each hour may contain track history points determined on the hour, and at one hour intervals. Conversely, Burst Sequences that begin at 10, 30 and 50 minutes past each hour may contain track history points determined on the midpoint of each hour, also at one hour intervals. In this way, successful reception of reports from a vessel in just two consecutive Burst Sequences—potentially as little as two minutes apart—could double the data points available for a vessel's track history. Moreover, even if only a single position report is received, adequate track history is nevertheless available. An example of this approach is illustrated in Table 7.

TABLE 7

| | Message Time | | | | | |
|---|---|---|---|---|---|---|
| | 12:00 | 12:10 | 12:20 | 12:30 | 12:40 | 12:50 |
| Track History 1 | 11:00 | 11:30 | 11:00 | 11:30 | 12:00 | 12:30 |
| Track History 2 | 10:00 | 10:30 | 10:00 | 10:30 | 11:00 | 11:30 |
| Track History 3 | 9:00 | 9:30 | 9:00 | 9:30 | 10:00 | 10:30 |
| Track History 4 | 8:00 | 8:30 | 8:00 | 8:30 | 9:00 | 9:30 |
| Track History 5 | 7:00 | 7:30 | 7:00 | 7:30 | 8:00 | 8:30 |
| Track History 6 | 6:00 | 6:30 | 6:00 | 6:30 | 7:00 | 7:30 |

TABLE 7-continued

| | Message Time | | | | | |
|---|---|---|---|---|---|---|
| | 12:00 | 12:10 | 12:20 | 12:30 | 12:40 | 12:50 |
| Track History 7 | 5:00 | 5:30 | 5:00 | 5:30 | 6:00 | 6:30 |
| Track History 8 | 4:00 | 4:30 | 4:00 | 4:30 | 5:00 | 5:30 |
| Track History 9 | 3:00 | 3:30 | 3:00 | 3:30 | 4:00 | 4:30 |

In some embodiments, the required code space (in bits) for the Track History may be reduced by employing Huffman coding or other equivalent approaches for frequently occurring words (e.g., positions, indexes, etc.).

A Huffman code may be used, for example, to encode the Track History using a variable number of bits per history point, with more frequently occurring encodings using less bits, and less frequently used history points using more bits, resulting in a net reduction in the number of bits required to encode an average track history. Such economy can be employed empirically when the historical position behavior results in an encoded track history of shorter average duration (less bits) to add one or more additional historical positions to this message. This process can happen dynamically, providing a variable length message that always uses available or allocated bits for history reports to the maximum extent possible, and when unusual behavior increases the average number of bits per position report in a particular message, the time duration of only that message can be shortened to fit the available bits.

For example, consider a circle with several diameters representing the radium, and 8 points around each radius representing direction. In this mapping, motion since the previous time interval, e.g., straight ahead is defined in an upward direction (i.e., toward the top of the circle). The points at the extreme left and right side are the least likely to occur, as they would only be used for a vessel at high speed, which is also making a 90° turn.

If a Huffman code is used, the most common motion, e.g., straight ahead, or some minor course change, or slow movement with larger angular change, may use less bits, while the extreme motion points above would use more encoding bits as these are expected to be more rare.

The described embodiments generally encode history points as a coordinate in space (e.g., radius and angle, x- and y-component, etc.). However, in some other embodiments, history points could be encoded as a velocity (a derivative of position) or an acceleration (a second derivative of position). Since the time interval is generally held constant between history points, both average velocity and average acceleration can be determined from change in position. The reverse approach could also be used if velocity or acceleration are encoded instead. Such encoding of changes in velocity for example may result in more efficient and higher precision encoding of historical positions for vessels that are not moving, or alternately continue to move at the same speed and heading (i.e., not changing their behavior). The latter scenario may enable efficiency gains when further combined with Huffman coding, described above.

Figure 6:
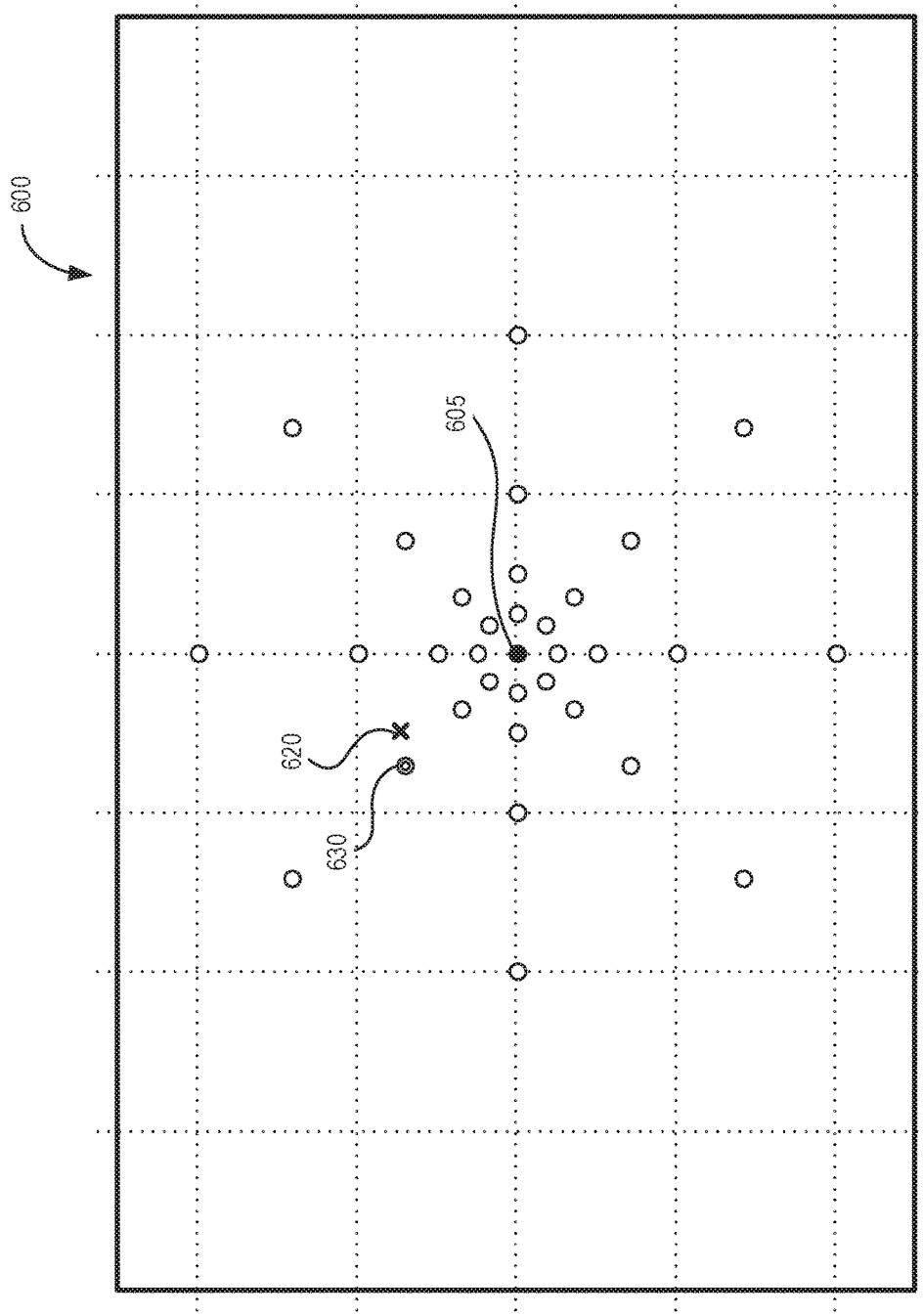
FIG. 6 is a diagram of a track history generated using the example point layout of FIG. 5.

Referring now to FIG. 6, there is illustrated a point layout 600. Point layout 600 follows the same predefined point pattern shown in FIG. 5. A current location point 605 is shown at the origin point of point layout 600. The actual historical position of the AIS transceiver at a time 30 minutes in the past is shown at actual historical point 620. The nearest predefined point to actual historical position point 620 is predefined point 630. Accordingly, predefined point 630 is selected as the most recent track history point.

To represent the most recent track history point in the Track History field, the index values for each of the radial and angular components of predefined point 630 may be concatenated in binary form. For example, predefined point 630 is at the $8^{th}$ angular position from a North compass point position when counted in clockwise order, accordingly, the 3-bits representing angular component are 111 in binary form (i.e., 8-1=7). Similarly, the radial component is at 4 nautical miles, or the third radial length, leading to 2-bits representing the radial component as 10 in binary form (i.e., 3-1=2). The 5-bit representation of predefined point 630 may be 11110, when angular component is specified first.

Additional track history points can be computed in similar fashion, by determining the nearest predefined points to previous historical positions separated by a fixed or otherwise predetermined time interval. Each additional track history point can be concatenated in the Track History field, up to a maximum Track History length.

Preferably, each predefined point in the Track History is recomputed when a new e-Navigation message is generated, since the origin point may shift (i.e., due to a new current location), causing previously selected predefined points to be less accurate representations of the historical positions stored in the AIS transceiver memory. However, mere re-transmissions of an e-Navigation message may not require recomputing points, since the origin point remains the same within the same Burst Sequence window.

Moreover, when the Track History is recomputed, a different predefined point layout may be used, and even a different bit precision or number of historical points. As such, each Track History has independent encoding estimation errors (which may also be referred to as "quantization" artifacts). Accordingly, a receiver of several e-Navigation messages from a particular AIS transceiver that contain different Track History fields (i.e., not simply re-transmissions within a Burst Sequence) with points that overlap in time, may use some form of statistical averaging of the reported historical positions at the same point in time to reduce the uncertainty of position in that same point (e.g., reduce the effective quantization error between the calculated and averaged historical position and the true unquantized position, known only to the encoder).

In order to reduce error in representing historical positions, various different radial and angular point layouts may be predefined in predefined tables. Moreover, different component values for point layouts may be predefined in component value arrays. This dual flexibility in both the relative arrangement of points, and also the specific component values assigned to points, allows for a lowest error representation to be constructed.

A best fit may be performed by computing the error for history points using a selection of predefined component values. The specific predefined component values chosen may be those that provide the lowest error between historical positions and track history positions. Various approaches may be used to minimize "quantization" error between the history points and the predefined points. For example, optimization routines may be based on the maximum error (e.g., in nautical miles or kilometers), total error in a Track History (e.g., the sum of all radial errors for all history points), root mean square error over all history points, and others. In some embodiments, combinations of the optimization routines may be used, or time-weighted criteria may be used (e.g., provide greater accuracy for more recent history points).

Generally, the selection of point layout, and optimization routines, may be based on known or expected behavior of a vessel. For example, in rail car applications, point layouts may be designed to contain more points in a forward or backward direction of motion, since rail cars generally travel along a fixed path with relatively radius turns. Likewise, an ocean-going vessel at a cruising speed, or an aircraft at cruise altitude, may favor point layouts with points clustered along a particular axis.

In some embodiments, the selected fit may be based on one or more quality metrics, such as average or absolute error. For example, selected fit may be "fit with minimum mean square error and also no more than 1 km of maximum radial error for any history point". In some embodiments, verification may be performed that eliminates fits that include history points that would appear to be on land (if the vessel is not actually on land, and a map of land contours is available to the encoding process).

Once the lowest error is determined and the specific predefined component values selected, the chosen predefined tables may be identified in the message sub-type identifier. In some example embodiments, various different combinations of first dimensional component values (e.g., radial) and second dimensional component values (e.g., angular) are defined in respective arrays of component values. Corresponding point layout look-up tables contain combinations of first dimensional indices and second dimensional indices, allowing for a specific combination to be identified by a compact point layout index.

In other embodiments, for example where point layouts with arbitrary point placement are used, a second dimensional component value may be omitted, and only a single, first dimensional component value that identifies a particular point (e.g., by referencing coordinate pairs in a predefined table) may be used.

Example predefined component value arrays, which specify points in a radial arrangement, are shown below. In the examples, all radial distances are in nautical miles. Angular measures are in degrees from the Course Over Ground direction (measured clockwise) of the current position of the AIS transceiver, or from the previous track. In some other embodiments, Angular measures may be in degrees from true north, or some other reference.

TABLE 7

| R1 | R2 | R3 | R4 | R5 | R6 | R7 | R8 | R9 | R10 | R11 | R12 |
|---|---|---|---|---|---|---|---|---|---|---|---|
| 0.05 | 0.25 | 0.05 | 6 | 0.1 | 0.25 | 0.25 | 0.05 | 0.05 | 0.25 | 0.05 | 0.025 |
| 0.5 | 1.5 | 0.5 | 8 | 0.75 | 2 | 6 | 0.5 | 1 | 0.50 | 0.5 | 0.25 |
| 1 | 3 | 1 | 10 | 1.5 | 4 | 8 | 1 | 2 | 0.75 | 1 | 0.50 |
| 2 | 4.5 | 12 | 12 | 2.25 | 6 | 10 | 1.5 | 3 | 1.00 | 1.5 | 0.75 |
| 3 | 6 | 14 | 14 | 3 | 8 | 12 | 2 | 4 | 1.25 | 2 | 1 |
| 4 | 7.5 | 16 | 16 | 4 | 10 | 14 | 2.5 | 5 | 1.50 | 2.5 | 1.25 |
| 5 | 9 | 18 | 18 | 5 | 12 | 17 | 3 | 6 | 1.75 | 3 | 1.50 |
| 6 | 11 | 20 | 20 | 6.5 | 14 | 20 | 3.5 | 7 | 2.00 | 3.5 | 1.75 |
| | | | | | | | 4 | 8 | 2.25 | 4 | 2 |
| | | | | | | | 4.5 | 9 | 2.50 | 4.5 | 2.25 |

TABLE 7-continued

| R1 | R2 | R3 | R4 | R5 | R6 | R7 | R8 | R9 | R10 | R11 | R12 |
|----|----|----|----|----|----|----|----|----|------|------|------|
|    |    |    |    |    |    |    | 5   | 10 | 2.75 | 5    | 2.50 |
|    |    |    |    |    |    |    | 5.5 | 11 | 3.00 | 5.5  | 2.75 |
|    |    |    |    |    |    |    | 6   | 12 | 3.50 | 6    | 3    |
|    |    |    |    |    |    |    | 6.5 | 13 | 4.00 | 6.5  | 3.25 |
|    |    |    |    |    |    |    | 7   | 15 | 4.50 | 7    | 3.50 |
|    |    |    |    |    |    |    | 7.5 | 18 | 5.00 | 7.5  | 3.75 |
|    |    |    |    |    |    |    |     |    |      | 8    | 4    |
|    |    |    |    |    |    |    |     |    |      | 8.5  | 4.25 |
|    |    |    |    |    |    |    |     |    |      | 9    | 4.50 |
|    |    |    |    |    |    |    |     |    |      | 9.5  | 4.75 |
|    |    |    |    |    |    |    |     |    |      | 10   | 5    |
|    |    |    |    |    |    |    |     |    |      | 10.5 | 5.25 |
|    |    |    |    |    |    |    |     |    |      | 11   | 5.50 |
|    |    |    |    |    |    |    |     |    |      | 11.5 | 5.75 |
|    |    |    |    |    |    |    |     |    |      | 12   | 6    |
|    |    |    |    |    |    |    |     |    |      | 12.5 | 6.25 |
|    |    |    |    |    |    |    |     |    |      | 13   | 6.50 |
|    |    |    |    |    |    |    |     |    |      | 14   | 7    |
|    |    |    |    |    |    |    |     |    |      | 15   | 7.50 |
|    |    |    |    |    |    |    |     |    |      | 16   | 8    |
|    |    |    |    |    |    |    |     |    |      | 18   | 9    |
|    |    |    |    |    |    |    |     |    |      | 20   | 10   |

Table 7 illustrates twelve separate component value arrays, labeled R1 through R12, which contain between 8 and 32 possible values. Depending on the amount of bits available to represent the radial component, not all arrays may be available (e.g., if only 3 bits are used, then R8 through R12 may not be available). Each of the values has an array index value. In practice, each e-Navigation message will identify the specific component array to be used, and the index of the component value to be used.

For example, an e-Navigation message may represent a radial component of 5.25 NM by specifying that radial component array R12 is to be used, and providing an index of 21 (10101). This uses only 4 bits to specify the component array, and only 5 bits to represent a specific value (5.25). Additional values for additional track history points can simply refer to other values within the same component array. For example, another history point may have a radial component value of 0.75 NM, which can be referenced at index 3 (00011).

Angular components can be represented in similar fashion. Table 8 illustrates eight separate component value arrays, labeled T1 through T7, which contain between 16 and 32 possible values. Depending on the amount of bits available to represent the angular component, not all arrays may be available (e.g., if only 3 bits are used, then T1 through T5 may not be available). Each of the values has an array index value. In practice, each e-Navigation message will identify the specific component array to be used, and the index of the component value to be used.

For example, an e-Navigation message may represent an angular component of 110.76° by specifying that angular component array T4 is to be used, and providing an index of 6 (00110). This uses only 3 bits to specify the component array, and only 5 bits to represent a specific value (110.76). Additional values for additional track history points can simply refer to other values within the same angular component array. For example, another history point may have an angular component value of 0°, which can be referenced at index 0 (00000).

TABLE 8

| T1 | T2 | T3 | T4 | T5 | T6 | T7 |
|------|------|------|------|------|------|------|
| 0.000 | 0 | 0 | 0 | 3 | 0 | 4.28 |
| 5.625 | 45 | 11.25 | 45 | 9 | 50 | 12.85 |
| 11.250 | 90 | 22.5 | 67.50 | 15 | 100 | 21.42 |
| 16.875 | 93 | 33.75 | 90 | 21 | 113.33 | 30 |
| 22.500 | 96 | 45 | 96.92 | 27 | 126.66 | 150 |
| 28.125 | 99 | 56.25 | 103.84 | 33 | 140 | 158.57 |
| 33.750 | 102 | 67.5 | 110.76 | 39 | 153.33 | 167.14 |
| 39.375 | 105 | 78.75 | 117.69 | 45 | 166.66 | 175.71 |
| 45.000 | 108 | 90 | 124.61 | 135 | 180 | 184.28 |
| 50.625 | 111 | 101.25 | 131.53 | 141 | 193.33 | 192.85 |
| 56.250 | 114 | 112.5 | 138.46 | 147 | 206.66 | 201.42 |
| 61.875 | 117 | 123.75 | 145.38 | 153 | 220 | 210 |
| 67.500 | 120 | 135 | 152.30 | 159 | 233.33 | 330 |
| 73.125 | 123 | 146.25 | 159.23 | 165 | 246.66 | 338.57 |
| 78.750 | 126 | 157.5 | 166.15 | 171 | 260 | 347.14 |
| 84.375 | 129 | 168.75 | 173.07 | 177 | 310 | 355.71 |
| 90.000 | 132 | 180 | 180 | 183 | | |
| 95.625 | 135 | 191.25 | 186.92 | 189 | | |
| 101.250 | 138 | 202.5 | 193.84 | 195 | | |
| 106.875 | 141 | 213.75 | 200.76 | 201 | | |
| 112.500 | 144 | 225 | 207.69 | 207 | | |
| 118.125 | 147 | 236.25 | 214.61 | 213 | | |
| 123.750 | 150 | 247.5 | 221.53 | 219 | | |
| 129.375 | 153 | 258.75 | 228.46 | 225 | | |
| 135.000 | 156 | 270 | 235.38 | 315 | | |
| 140.625 | 159 | 281.25 | 242.30 | 321 | | |
| 146.250 | 162 | 292.5 | 249.23 | 327 | | |
| 151.875 | 165 | 303.75 | 256.15 | 333 | | |
| 157.500 | 168 | 315 | 263.07 | 339 | | |
| 163.125 | 171 | 326.25 | 270 | 345 | | |
| 168.750 | 174 | 337.5 | 292.50 | 351 | | |
| 174.375 | 177 | 348.75 | 315 | 357 | | |
| 180.000 | 180 | | | | | |
| 185.625 | 183 | | | | | |
| 191.250 | 186 | | | | | |
| 196.875 | 189 | | | | | |
| 202.500 | 192 | | | | | |
| 208.125 | 195 | | | | | |
| 213.750 | 198 | | | | | |
| 219.375 | 201 | | | | | |
| 225.000 | 204 | | | | | |
| 230.625 | 207 | | | | | |
| 236.250 | 210 | | | | | |
| 241.875 | 213 | | | | | |
| 247.500 | 216 | | | | | |
| 253.125 | 219 | | | | | |
| 258.750 | 222 | | | | | |
| 264.375 | 225 | | | | | |

TABLE 8-continued

| T1 | T2 | T3 | T4 | T5 | T6 | T7 |
|---|---|---|---|---|---|---|
| 270.000 | 228 | | | | | |
| 275.625 | 231 | | | | | |
| 281.250 | 234 | | | | | |
| 286.875 | 237 | | | | | |
| 292.500 | 240 | | | | | |
| 298.125 | 243 | | | | | |
| 303.750 | 246 | | | | | |
| 309.375 | 249 | | | | | |
| 315.000 | 252 | | | | | |
| 320.625 | 255 | | | | | |
| 326.250 | 258 | | | | | |
| 331.875 | 261 | | | | | |
| 337.500 | 264 | | | | | |
| 343.125 | 267 | | | | | |
| 348.750 | 270 | | | | | |
| 354.375 | 315 | | | | | |

In some embodiments, the representation of component value arrays can be made even more compact, by predefining specific combinations of first and second dimensional component value arrays, and using indexes to refer to these specific combinations. This index may serve as the effective first dimensional component value in such embodiments, and the second dimensional component value can be omitted from the message. Table 9 provides an example point layout look-up table that provides such combinations. An index column identifies indexes for each combination, which refers to radial component arrays R1 through R12 (as shown in Table 7) and angular component arrays T1 through T7 (as shown in Table 8).

TABLE 9

| Index | Radial | Angular |
|---|---|---|
| 0 | Undefined | Undefined |
| 1 | R1 | T1 |
| 2 | R2 | T1 |
| 3 | R3 | T1 |
| 4 | R4 | T1 |
| 5 | R5 | T2 |
| 6 | R2 | T2 |
| 7 | R6 | T2 |
| 8 | R7 | T2 |
| 9 | R8 | T3 |
| 10 | R9 | T3 |
| 11 | R10 | T3 |
| 12 | R8 | T4 |
| 13 | R9 | T4 |
| 14 | R10 | T4 |
| 15 | R8 | T5 |
| 16 | R9 | T5 |
| 17 | R11 | T6 |
| 18 | R12 | T7 |
| 19 | R11 | T6 |
| 20 | R12 | T7 |
| 21-255 | Future use | Future use |

When Course Over Ground direction is used as the reference for angular measures, the Course Over Ground reference may change from one e-Navigation to the next, because vessels typically will not keep the same course for several hours. In some embodiments, to minimize error, the most recent track history point may be the only point whose angular component is measured with respect to the Course Over Ground reference. Subsequent track history points may use an angular component calculated with reference to a line that intersects the two previous points. This may be referred to as a calculated or simulated Course Over Ground. The simulated Course Over Ground for each point may be used as the reference (i.e., determine 0°) for the purpose of determining an angular measure for the next track history point.

Locations provided by a GNSS receiver are typically provided in latitude and longitude. In order to convert latitude and longitude to radial and angular components, a conversion can be applied. Since lines of latitude do not converge, 1 nautical mile may be defined as always approximated by 1/60 of a degree. Therefore the conversion from latitude to distance can be determined from:

$$d_{lat} = \Delta lat * 60$$

where $d_{lat}$ is the distance in nautical miles in the y-axis of the unrotated GNSS grid, and where $\Delta lat$ is the change in points of latitude (in degrees).

Lines of longitude converge at the North and South Poles. Accordingly, the distance between lines of longitude changes with respect to latitude. To map measured longitude with the track history points specified in radial and angular components, a mapping function may be used, which uses a multiplier to account for the varying distances in longitude depending on changes in latitude.

In some examples, a constant multiplier value may be used for each transmitted message.

The constant multiplier can be calculated using the most recently updated latitude. Using a spherical Earth approximation, the conversion from longitude to distance will be:

$$d_{lon} = (2*pi*R_E*\cos(lat))*(\Delta lon/360)$$

Where $d_{lon}$ is distance in nautical miles in the x-axis of the unrotated GNSS grid, $R_E$ is approximate Earth equatorial radius of 3444 nautical miles, lat is the latitude in the message to be transmitted, and $\Delta lon$ is the change in points of longitude (in degrees).

The factor $d_{lon}$ may be used for conversions from longitude to distance for the message to be transmitted. Use of $d_{lon}$ effectively results in an Oblique Gnomic projection of the Earth.

Figure 7:
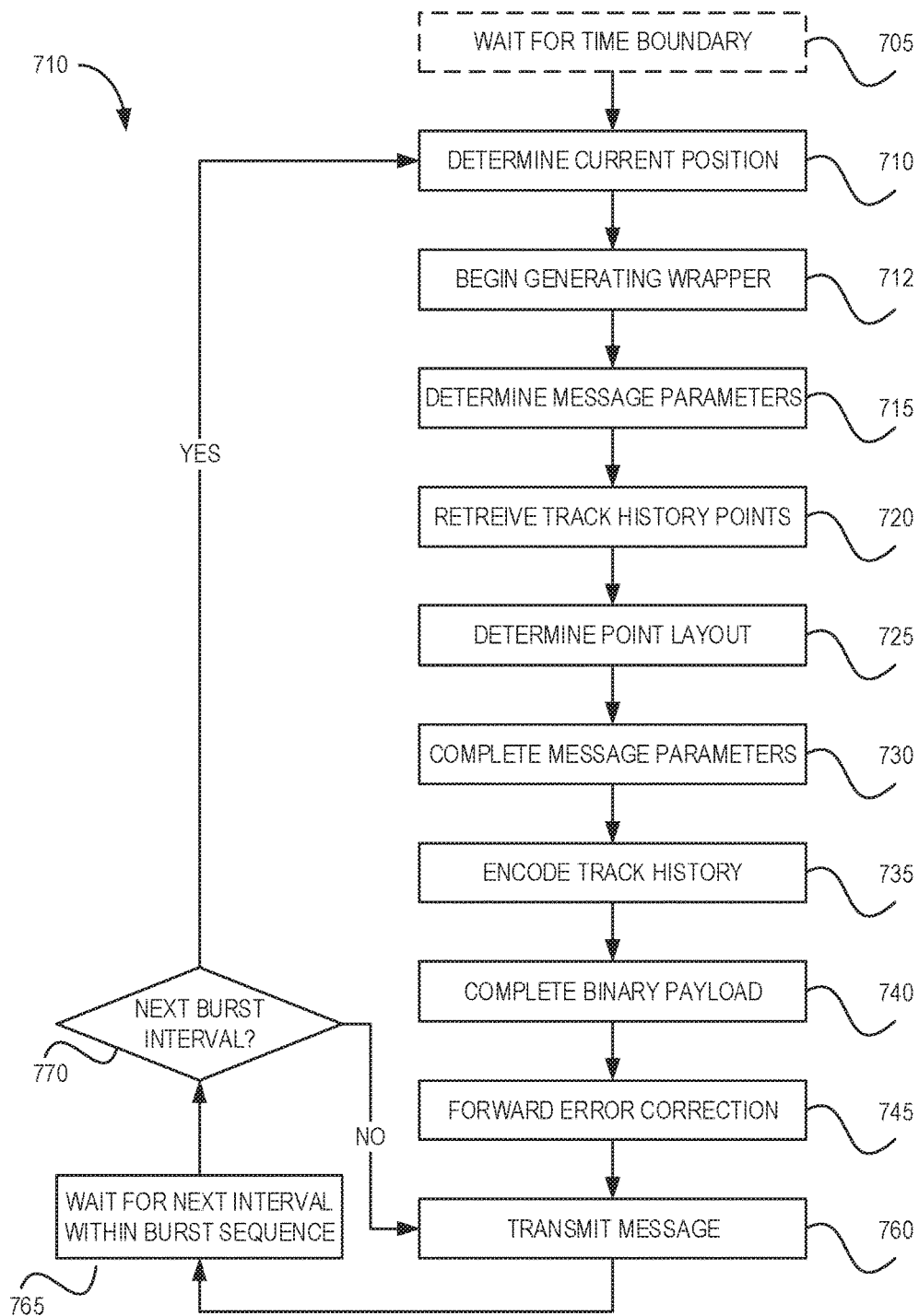
FIG. 7 is a functional flow diagram for an example method of generating an e-Navigation message.

Referring now to FIG. 7, there is illustrated a flow diagram for an example method 700 of generating an e-Navigation message. Method 700 may be carried out, for example, by transmitter 200 of FIG. 2.

As described herein, the generated e-Navigation message can contain a binary payload. The binary payload can be encapsulated in a message wrapper that is compliant with industry standard messaging formats, such as AIS. In addition, one or more error protection (which may also be called error correction or error recovery) encoding schemes can be applied to the binary payload in order to maximize the probability of detecting this portion of the message at the receiver. In particular, a Forward Error Correction (FEC) coding may be applied.

In some embodiments, method 700 may begin with the transmitter 200 waiting for a timing boundary at 705, such as, for example, a 10 minute boundary or some other predefined boundary that delineates the beginning of a new Burst Sequence. Once the timing boundary is encountered, a Burst Sequence Flag value may be changed to indicate the start of a new Burst Sequence. In some other embodiments, if a timing boundary is not used, method 700 may begin at 710 or after some predefined fixed interval.

At 710, a position module or GNSS receiver determines a current geolocation of the vessel or alternately, has a recent position fix that can be read from a memory location or register, its GNSS receiver or the AIS transceiver. If a standalone GNSS receiver is used, the GNSS receiver may output the current geolocation to the AIS transceiver. The current or recent geolocation generally includes a current longitude and latitude of the GNSS receiver. The AIS transceiver or GNSS receiver may further determine a Course Over Ground of the vessel. In an example embodiment, a position fix and a COG obtained less than about 30 seconds (preferably less than 10 seconds) before the time boundary should be adequate to minimize discrepancies between reported and actual position at a time boundary.

At 712, the AIS transceiver may generate portions of the e-Navigation message wrapper, such as Message ID, Repeat Indicator, MMSI, and Application ID.

At 715, the AIS transceiver determines one or more e-Navigation message parameters. Examples of parameters to be determined include, for example, a transmitter identifier and a portion of the message sub-type identifier—which may itself involve determining whether a message to be generated will include a full track history or a partial track history. In the case of a partial track history, the message parameters may further include a number of track history points to be included in the message, Alert Flags to be included in the message, and a Spare field value.

Once the number of track history points is known, sufficient historical track history points may be retrieved from a memory of the AIS transceiver at 720. Historical track history points may be retrieved from a locally-stored log of prior e-Navigation messages (e.g., based on the current locations included in those messages) or from stored GNSS data. As described herein, historical track history points may be separated by a fixed interval of, for example, 30 minutes.

At 725, AIS transceiver may iterate through a plurality of predefined point layouts in one or more predefined point layout look-up tables, to identify a best fit of the historical track history points to one of the predefined point layouts. The chosen predefined point layouts can be identified by their associated indices in the predefined look-up tables.

In other embodiments, specific look-up tables for each of the first and second dimensions may be used. For example, a first table with a first index may identify the chosen component values in a first dimension, such as radial component or x-component, and a second index may identify the chosen component values in a second dimension, such as angular component or y-component.

In some embodiments, the AIS transceiver may select longer track histories (i.e., with less bit precision) for less complex tracks, such as where there are no course changes over a multi-hour period. Conversely, the AIS transceiver may select shorter track histories (i.e., with greater bit precision) for more complex tracks, such as where there have been one or more course changes over a multi-hour period. This allows for a trade-off between accuracy and history length. In some cases, the AIS transceiver may allow for lesser accuracy (e.g., greater error) to allow for longer history. In other cases, the AIS transceiver may always seek to minimize error.

For example, the AIS transceiver may analyze possible point layouts to determine whether multiple point layouts can provide a maximum threshold error of, e.g., 1 km of error at any of the history points. If so, the point layout that uses the minimum number of bits per point would be selected, even though another point layout may achieve a smaller amount of error but at a higher bit cost, and hence, a shorter number of history points.

Once the point layout and component values are known, the message sub-type identifier may be completed at 730.

At 735, the track history is encoded using the historical track history points and fitting to the selected predefined point layout and component values, as described herein.

Once the track history is encoded, the binary payload is completed at 740, by inserting Alert Flags or Spare field values, if any, at 740. A payload CRC is also computed once the binary payload is fully specified.

In the example embodiments, the binary payload, including the payload CRC, is error protection encoded, e.g., using forward error correction coding, at 745. The error protection encoded binary payload is then encapsulated in a message wrapper as described herein to form the completed e-Navigation message, using message formatting module 265, for example. For example, the message wrapper may be an AIS message wrapper including a ramp up field, an AIS training sequence, a start flag, an application identifier, a MMSI, a full message CRC computed for the message, a buffer, and a stop flag.

The completed e-Navigation message is then transmitted at 760 using a transmitter such as transmitter 210 of FIG. 2. In some embodiments, transmission may occur over existing AIS frequencies (e.g., AIS channels 1 or 2). In other embodiments where backwards compatibility with AIS is not needed, new or dedicated frequencies may be used. The transmitter may then wait a predetermined interval, such as 2 minutes, at 765.

At 770, the AIS transceiver determines whether to the next Burst Sequence time boundary has been reached. If the next time boundary has been reached, the AIS transceiver returns to 710 to determine or utilize either a new or saved position from memory and generate a new e-Navigation message.

If the next time boundary has not yet been reached, the AIS transceiver can retransmit the previously generated e-Navigation message and returns to 760 to retransmit the message.

In some alternative embodiments, acts of method 700 may be omitted. For example, forward error correction may be omitted, or only one message may be sent per burst interval.

Figure 8:
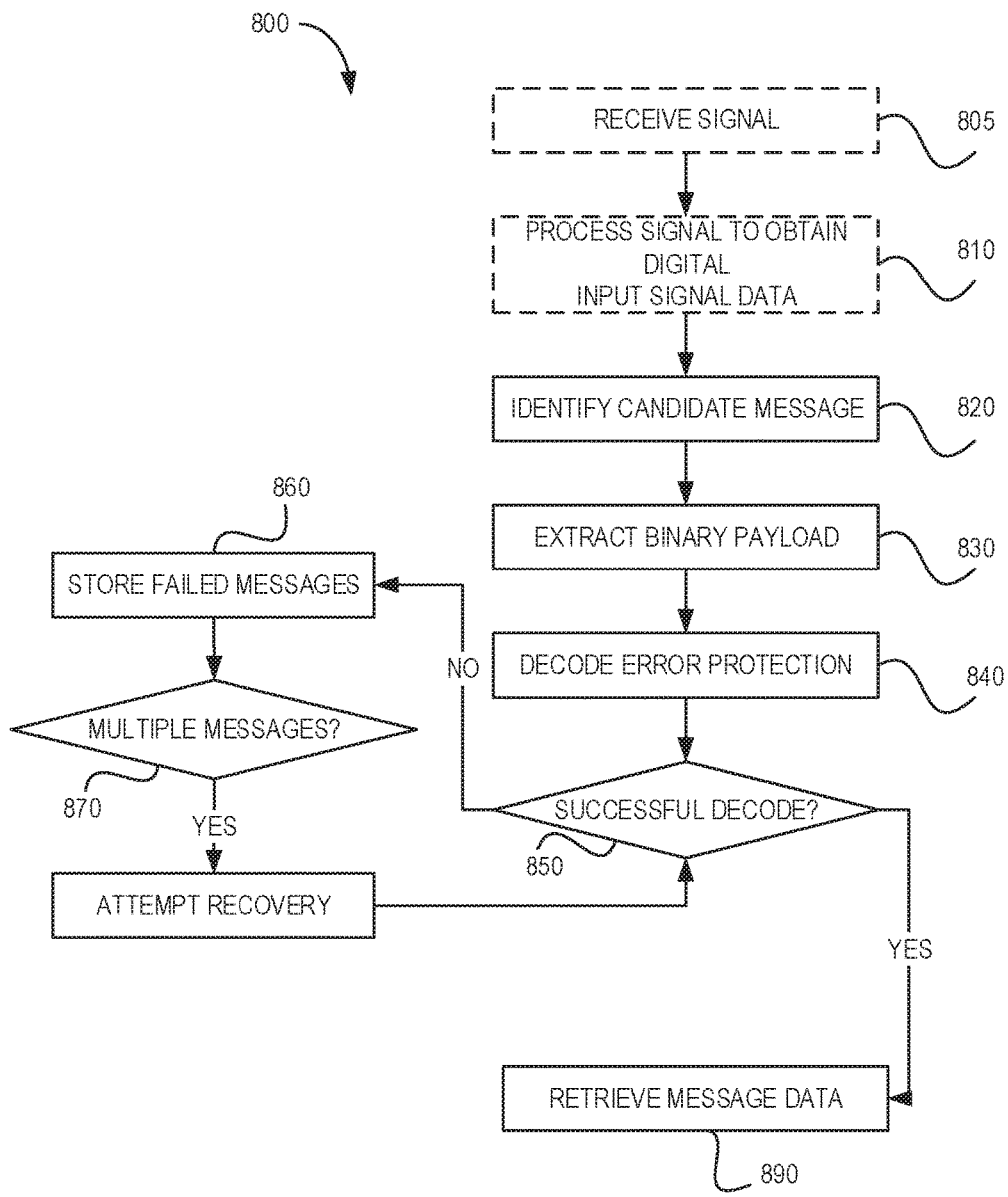
FIG. 8 is a functional flow diagram for an example method of receiving and processing an e-Navigation message with enhanced detectability.

Referring now to FIG. 8, there is illustrated a flow diagram for an example method 800 of receiving and processing an e-Navigation message. Method 800 may be carried out, for example, by receiver 300 of FIG. 3.

Method 800 begins at 805 by receiving a signal and generating pre-processed signal data, using at least one antenna 310 and RF receiver stage 320 of receiver 300, for example.

At 810, the pre-processed signal data is processed by message processing module 360, for example, which may perform GMSK demodulation followed by Non-Return to Zero Inverted (NRZI) decoding, de-stuffing and bit reversal to recover input signal data.

At 820, a candidate e-Navigation message may be identified in the input signal data. Candidate messages may be identified, for example, by correlating the input signal data with predetermined sequences. For example, the standard 24-bit AIS training sequence may be used to perform correlations, and optionally the 8-bit start flag to form a total of a 32-bit correlation sequence. Other known sequences in AIS messages, such as the start flag and end flag, or AIS message type, may also be used. In some embodiments, still other fields or bit sequences of the e-Navigation message—and the message wrapper in particular—may be used when they are known by the receiver or processor. For example, the Message Type field may be used in some cases, when it is known by the processor. Various other techniques for identifying candidate messages may also be used.

In some cases, identification of candidate messages may exploit one more diversity schemes implemented at the transmitter, in addition to those described herein.

In conventional AIS receivers, once a candidate message is identified, the full message CRC may be used to validate the message data. For example, a CRC validation may be used to determine whether the message data contains one or more bit errors. In conventional receivers, the detection of bit errors generally causes the receiver to discard the message data. However, in the described embodiments, processing of the candidate message may continue even in the presence of one or more bit errors.

Once a candidate message is identified, the binary payload can be extracted at 830. In some embodiments, the binary payload may be determined by computing one or more bit offsets from one or more predetermined features (e.g., training sequence, start flag, message type, end flag, etc.) of the candidate message. For example, a bit offset from the AIS training sequence may be used to identify the start of the binary payload and the payload may be extracted based on an expected message length or by extracting data until a payload CRC, full message CRC or message end flag is found, for example.

Once the error protection encoded binary payload is extracted from the candidate message, error protection decoding may be attempted at 840. Decoding generally involves reversal of the encoding actions performed by the transmitter (e.g., transmitter 200). For example, if the error protection encoding comprised forward error correction encoding, then the decoding comprises forward error correction decoding.

At 850, it is determined whether the error protection was successfully decoded. If error protection decoding fails (i.e., the error protection encoding cannot be successfully decoded), or if CRC checks fail, the AIS receiver may store a candidate message which has failed validation at 860. Otherwise, the AIS transceiver may proceed with retrieving message data from the decoded message at 890.

The AIS transceiver may determine, at 870, whether more than one failed message has been stored that belongs to a common Burst Sequence. If a plurality of stored messages are available, the AIS receiver may perform recovery processing at 880 as described herein (e.g., voting, summing, etc.), and generate a recovered message, which becomes the new candidate message for evaluation at 850.

As noted above, following decoding of the error protection scheme or schemes, the message data may be retrieved at 890. Retrieval of message data generally includes performing operations to reverse the source coding applied by the transmitter when generating the raw binary payload.

Accordingly, the described embodiments may, in some cases, provide a significant overall enhancement to detectability of e-Navigation messages in noisy and congested channels, and to provide ancillary information such as track history in a compact representation.

In some alternative embodiments, the binary payload may not be error-protection encoded, or the payload may not be binary encoded, or both. In such embodiments, processing of the message may omit extraction of the binary payload, error-protection decoding or other acts of method 800.

To facilitate the described detection approaches, corresponding transmitters can be easily incorporated into new or existing AIS transponders. Existing AIS transponders may require changes to internal message assembly and coding algorithms. Additionally, message frequency and co-ordination (scheduling) may need to be programmed in the language of the transponder controller or processor, which may accomplished through a firmware update in many cases.

In some embodiments, existing AIS transponders may continue to be used with little or no modification.

Although described herein with reference to e-Navigation and AIS, the present embodiments may also be applied to other known or future maritime communications signaling standards and protocols, such as Vessel Traffic Service (VTS) and channels allocated specifically to application specific messaging (ASM). In such future embodiments, the message wrapper may be significantly reduced or eliminated (e.g., for reasons of efficiency) leaving only necessary synchronization bits, some basic identification of the message type in a binary field, in addition to the forward error protected payload. Furthermore, future message types may also not require a stop flag, full message CRC, bitstuffing or guard bits.

The embodiments of the methods and systems described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices, in known fashion.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein.

Furthermore, the systems and methods of the described embodiments are capable of being distributed in a computer program product including a physical, non-transitory computer readable medium that bears computer usable instructions for one or more processors, where the instructions, when executed by the one or more processors, cause the computer to perform the functions described herein. The medium may be provided in various forms, including one or more diskettes, compact disks, tapes, chips, magnetic and electronic storage media (e.g., firmware), and the like. Non-transitory computer-readable media comprise all computer-readable media, with the exception being a transitory, propagating signal. The computer useable instructions may also be in various forms, including compiled and non-compiled code.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various embodiments described herein. The scope of the claims should not be limited by the preferred embodiments and examples, but should be given the broadest interpretation consistent with the description as a whole.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

We claim:

1. A method of transmitting a message that identifies a geographical position from a transmitter device, the method comprising:
   storing one or more prior geographical positions of the transmitter device in a memory;
   selecting a predetermined point layout from a plurality of predetermined point layouts, each of the plurality of predetermined point layouts comprising a plurality of predefined point positions;
   associating each of one or more prior geographical positions to respective nearest predefined point positions in the predetermined point layout to generate a track history;
   encoding the track history to generate an encoded track history;
   generating the message comprising the encoded track history; and
   transmitting the message.

2. The method of claim 1, further comprising determining a new geographical position and storing the new geographical position in the memory.

3. The method of claim 1, further comprising updating the track history based on course over ground.

4. The method of claim 1, further comprising setting a message type identifier, wherein the message further comprises the message type identifier.

5. The method of claim 1, further comprising retrieving a transmitter identifier, wherein the message further comprises the transmitter identifier.

6. The method of claim 1, wherein each of the one or more track history points are separated by a preselected time interval.

7. The method of claim 1, wherein the predetermined point layout is selected by computing minimum mean square error of the one or more prior geographical positions relative to the predefined point positions in each of the plurality of possible predetermined point layouts.

8. The method of claim 1, wherein the predetermined point layout is selected by computing maximum error of the one or more prior geographical positions relative to the predefined point positions in each of the plurality of predetermined point layouts.

9. The method of claim 1, further comprising selecting a first dimensional component value array, wherein the first dimensional component value array defines the values of successive points in the predetermined point layout.

10. The method of claim 9, wherein the first dimensional component value arrays are defined in a first look up table having a first index.

11. The method of claim 10, wherein each track history point in the track history is identified at least by a respective index value from the first index.

12. The method of claim 11, wherein each of the respective index values is Huffman encoded in the track history.

13. The method of claim 9, further comprising selecting a second dimensional component value array, wherein the second dimensional component value array defines the values of successive points in the predetermined point layout.

14. The method of claim 13, wherein the second dimensional component value arrays are defined in a second look up table having a second index.

15. The method of claim 14, wherein the first and second indices are selected in a point layout look-up table.

16. The method of claim 1, wherein at least one of the track history points comprises an alert flag tag.

17. The method of claim 1, wherein the encoding comprises determining the track history is a partial track history that includes less than a preset number of track history points.

18. The method of claim 1, wherein the message comprises a binary payload and wherein the encoded track history is comprised in the binary payload.

19. The method of claim 18, wherein the binary payload comprises at least one of an alert identifier, a course over ground indication, a latitude and longitude indication and a cyclic redundancy check code.

20. The method of claim 18, further comprising error protection encoding the binary payload.

21. An apparatus for transmitting a message that identifies a geographical position, the apparatus comprising:
   a memory that stores one or more prior geographical positions of the apparatus;
   a processor configured to:
   select a predetermined point layout from a plurality of predetermined point layouts, each of the plurality of predetermined point layouts comprising a plurality of predefined point positions;
   associate each of one or more prior geographical positions to respective nearest predefined point positions in the predetermined point layout to generate a track history;
   encode the track history to generate an encoded track history;
   generate the message comprising the encoded track history; and
   a transmitter that transmits the message.

22. A non-transitory computer readable medium storing computer executable instructions, the instructions, when executed by a computer processor of a transmitter device, for causing the computer processor to perform a method of transmitting a message that identifies a geographical position, the method comprising:
   storing one or more prior geographical positions of the transmitter device in a memory;
   selecting a predetermined point layout from a plurality of predetermined point layouts, each of the plurality of predetermined point layouts comprising a plurality of predefined point positions;
   associating each of one or more prior geographical positions to respective nearest predefined point positions in the predetermined point layout to generate a track history;
   encoding the track history to generate an encoded track history;
   generating the message comprising the encoded track history; and
   controlling a transmitter to transmit the message.

23. A method of transmitting a message that identifies a geographical position, the method comprising:
- selecting a first dimensional component value array, wherein the first dimensional component value array defines the values of successive points in a predetermined point layout that has a plurality of predefined point positions;
- encoding a track history to generate an encoded track history, wherein the track history comprises one or more track history points based on prior geographical positions, and wherein each of the track history points is determined with reference to the predetermined point layout;
- generating the message comprising the encoded track history; and
- transmitting the message.

24. The method of claim 23, wherein the first dimensional component value arrays are defined in a first look up table having a first index.

25. The method of claim 24, further comprising selecting a second dimensional component value array, wherein the second dimensional component value array defines the values of successive points in the predetermined point layout.

26. The method of claim 25, wherein the second dimensional component value arrays are defined in a second look up table having a second index.

27. The method of claim 26, wherein the first and second indices are selected in a point layout look-up table.

* * * * *

UNITED STATES PATENT AND TRADEMARK OFFICE
CERTIFICATE OF CORRECTION

PATENT NO. : 9,842,504 B2
APPLICATION NO. : 15/590574
DATED : December 12, 2017
INVENTOR(S) : Christopher M. Short et al.

Page 1 of 1

It is certified that error appears in the above-identified patent and that said Letters Patent is hereby corrected as shown below:

In the Claims

Claim 7, Column 31, Line 55, please delete "possible predetermined point layouts" and substitute --predetermined point layouts--.

Signed and Sealed this
Seventeenth Day of September, 2019

Andrei Iancu
*Director of the United States Patent and Trademark Office*